(12) United States Patent
Savini et al.

(10) Patent No.: US 11,493,372 B2
(45) Date of Patent: Nov. 8, 2022

(54) ELECTROMAGNETIC MEASURING DEVICE FOR DETECTION OR CONTROL DEVICE FOR LIQUID CONDUCTING APPLIANCES

(71) Applicant: ELTEK S.p.A., Casale Monferrato (IT)

(72) Inventors: Paolo Savini, Casale Monferrato (IT); Daniele Cerruti, Casale Monferrato (IT); Roberto Grappiolo, Casale Monferrato (IT)

(73) Assignee: ELTEK S.P.A., Casale Monferrato (IT)

( * ) Notice: Subject to any disclaimer, the term of this patent is extended or adjusted under 35 U.S.C. 154(b) by 160 days.

(21) Appl. No.: 16/970,268

(22) PCT Filed: Feb. 15, 2019

(86) PCT No.: PCT/IB2019/051238
§ 371 (c)(1),
(2) Date: Aug. 14, 2020

(87) PCT Pub. No.: WO2019/159122
PCT Pub. Date: Aug. 22, 2019

(65) Prior Publication Data
US 2021/0140805 A1    May 13, 2021

(30) Foreign Application Priority Data

Feb. 16, 2018 (IT) .................. 102018000002751

(51) Int. Cl.
*G01F 1/58* (2006.01)
(52) U.S. Cl.
CPC .................. *G01F 1/588* (2013.01)

(58) Field of Classification Search
None
See application file for complete search history.

(56) References Cited

U.S. PATENT DOCUMENTS

| 4,346,604 A | 8/1982 | Snook et al. |
|---|---|---|
| 5,417,119 A | 5/1995 | Smoll |

(Continued)

FOREIGN PATENT DOCUMENTS

| EP | 2 469 244 | 6/2012 |
|---|---|---|
| JP | 63-210623 | 9/1988 |
| JP | 2007-298398 | 11/2007 |

OTHER PUBLICATIONS

International Search Report for PCT/IB2019/051238 dated May 3, 2019, 4 pages.

(Continued)

*Primary Examiner* — Harshad R Patel
(74) *Attorney, Agent, or Firm* — Nixon & Vanderhye P.C.

(57) ABSTRACT

An electromagnetic measuring device includes a hydraulic body defining a duct for a flow of a liquid, and a flow sensor on the hydraulic body that includes an electromagnetic arrangement for generating an electromagnetic field through the duct in a direction transverse to the flow of the liquid, and detection arrangement including two electrical detection elements for detecting a potential difference induced by the flow of the liquid through the electromagnetic field. The detection elements are associated to one and the same face of a substrate, which extends on the outside of the duct in a position corresponding to a first side of the duct. The first side of the duct has two through openings, each of which is in a position corresponding to a respective electrical detection element.

20 Claims, 16 Drawing Sheets

(56) References Cited

U.S. PATENT DOCUMENTS

2014/0047927 A1* 2/2014 Marsh .................... G01F 1/588
                                                    73/861.12
2018/0216978 A1* 8/2018 Dames .................... G01F 15/14

OTHER PUBLICATIONS

Written Opinion of the ISA for PCT/IB2019/051238 dated May 3, 2019, 8 pages.

* cited by examiner

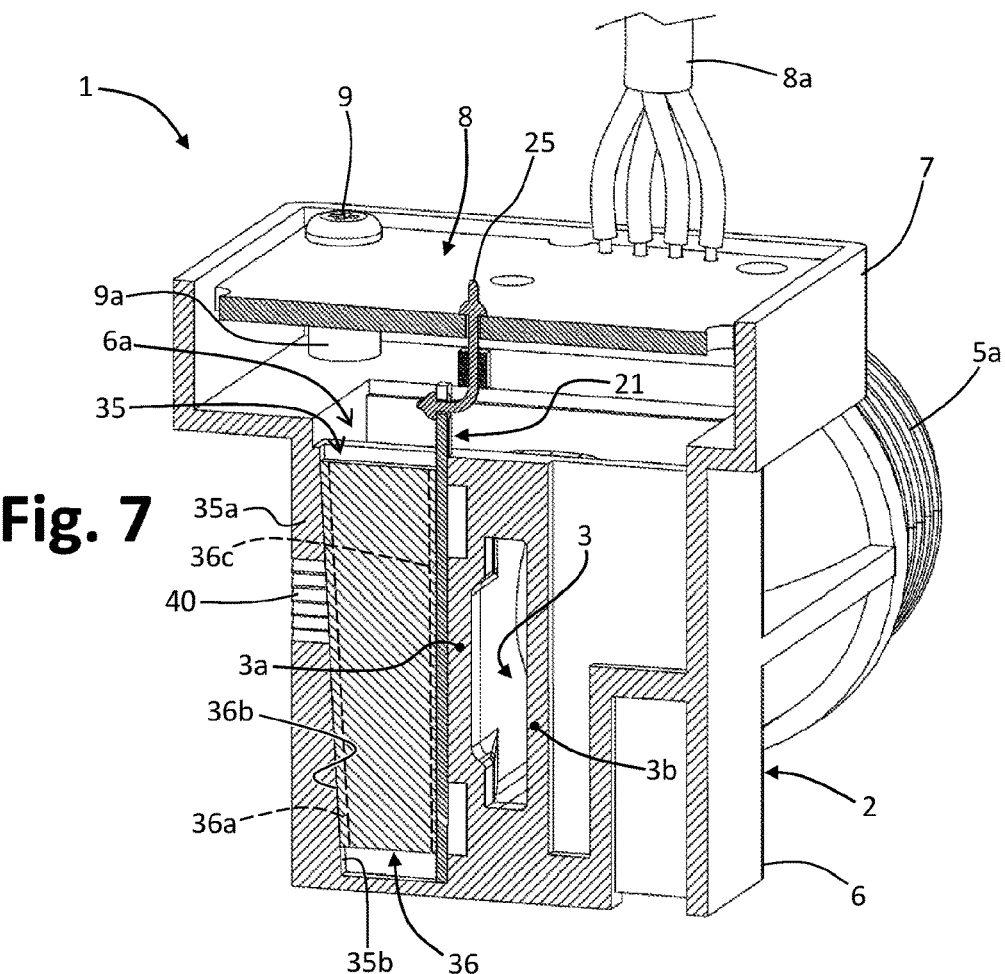
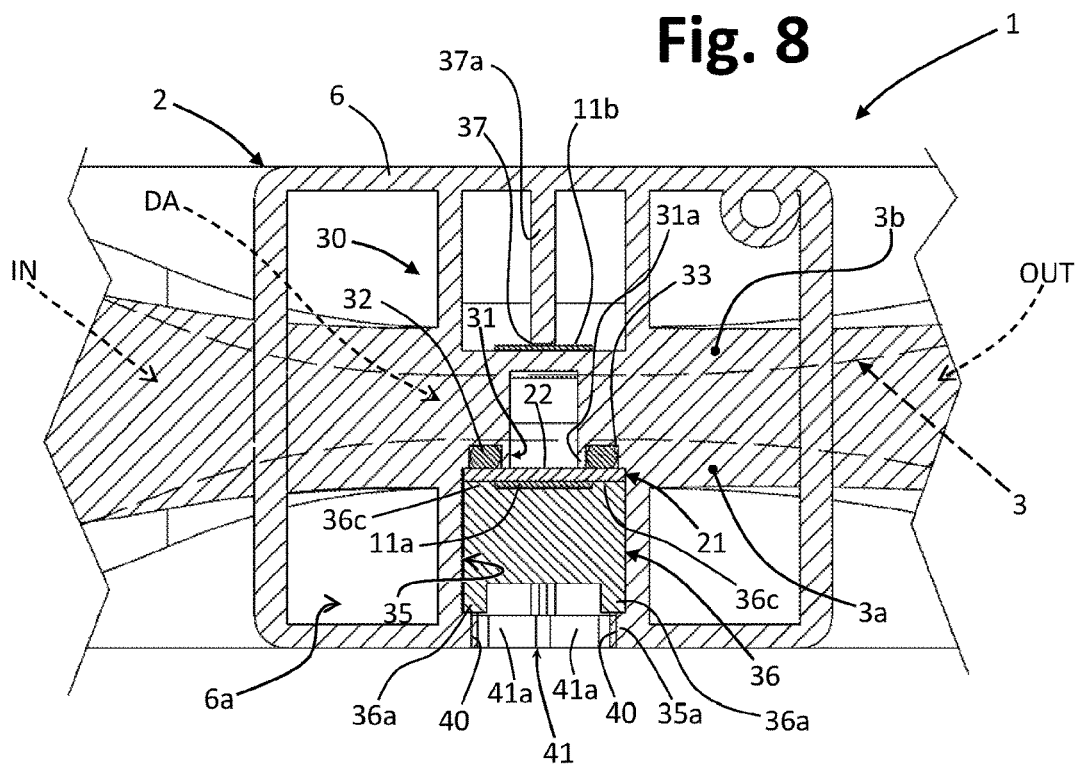

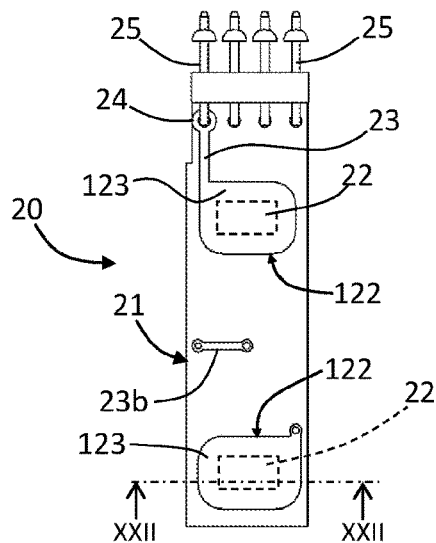 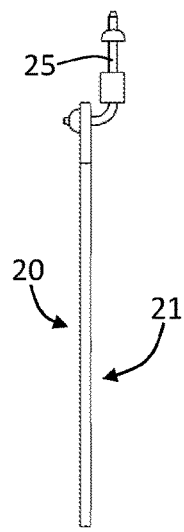 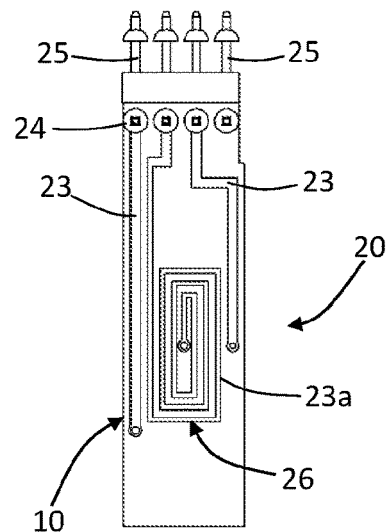
Fig. 21  Fig. 22  Fig. 23
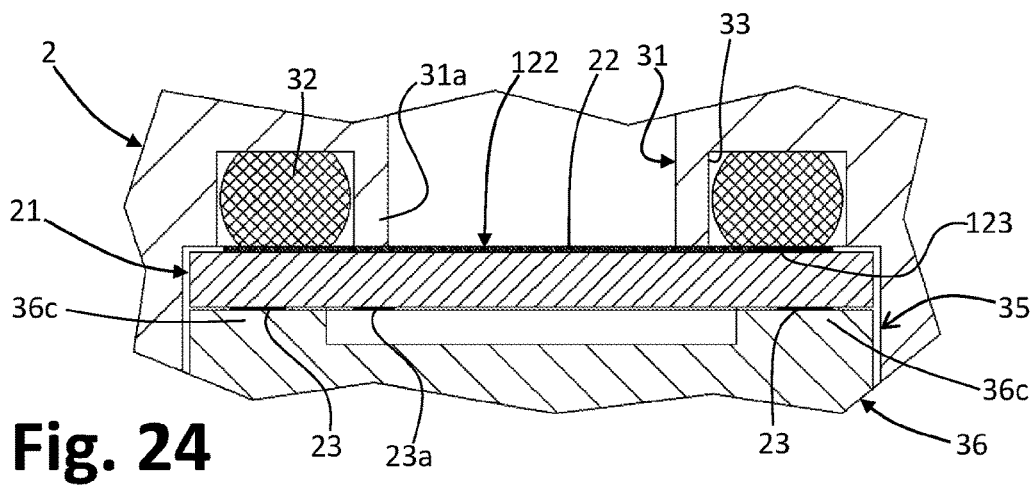
Fig. 24
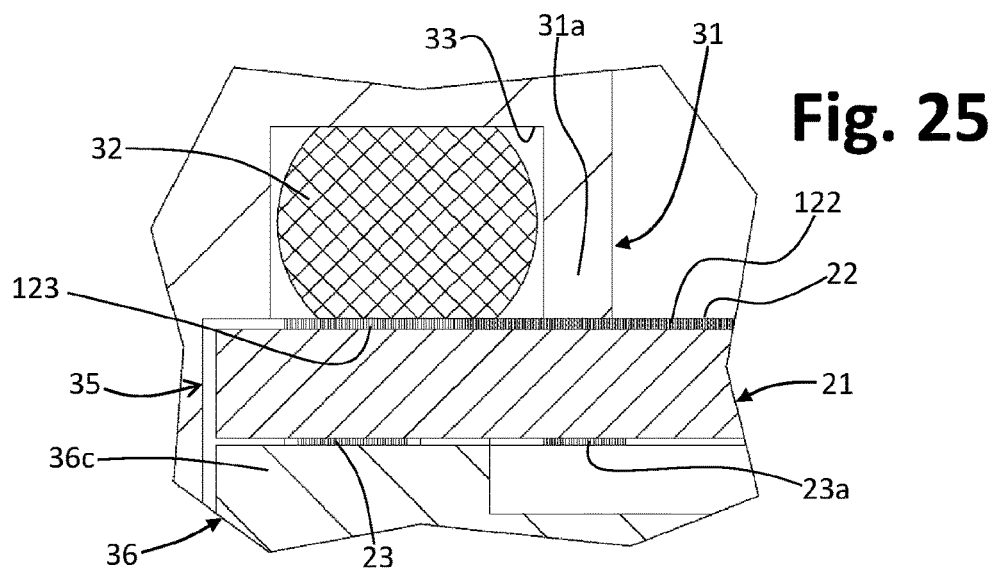
Fig. 25

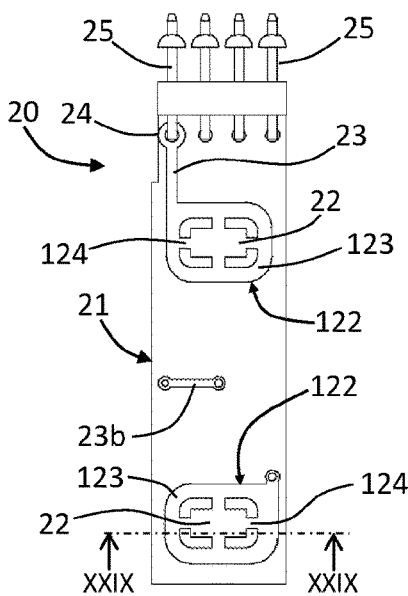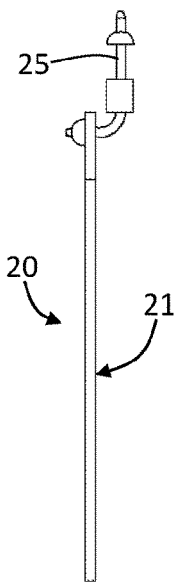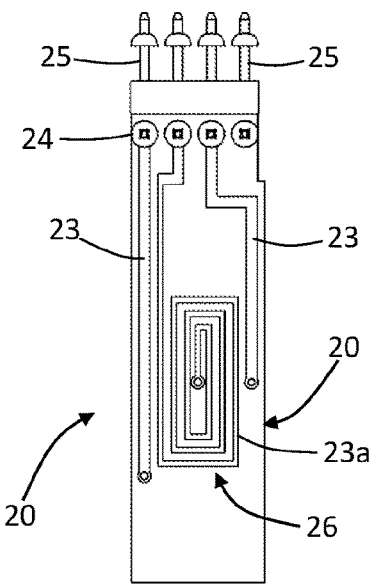
Fig. 26    Fig. 27    Fig. 28
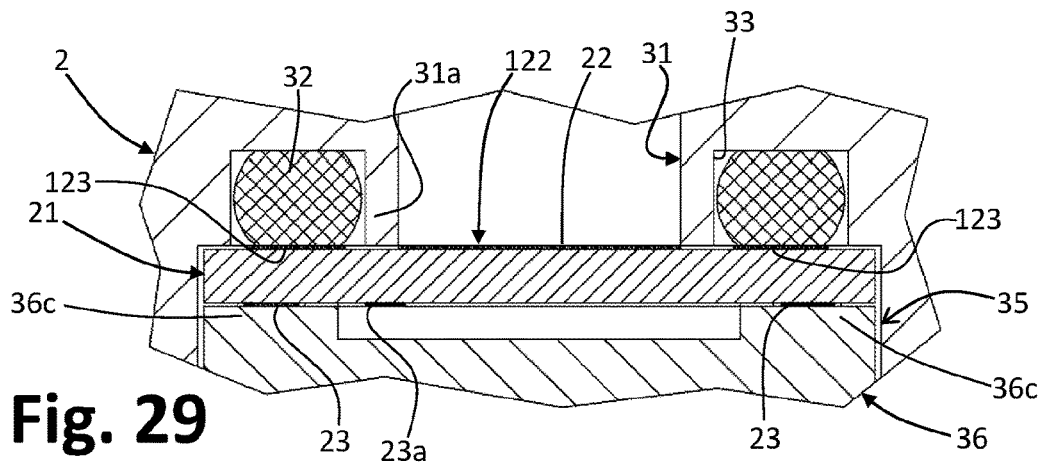
Fig. 29
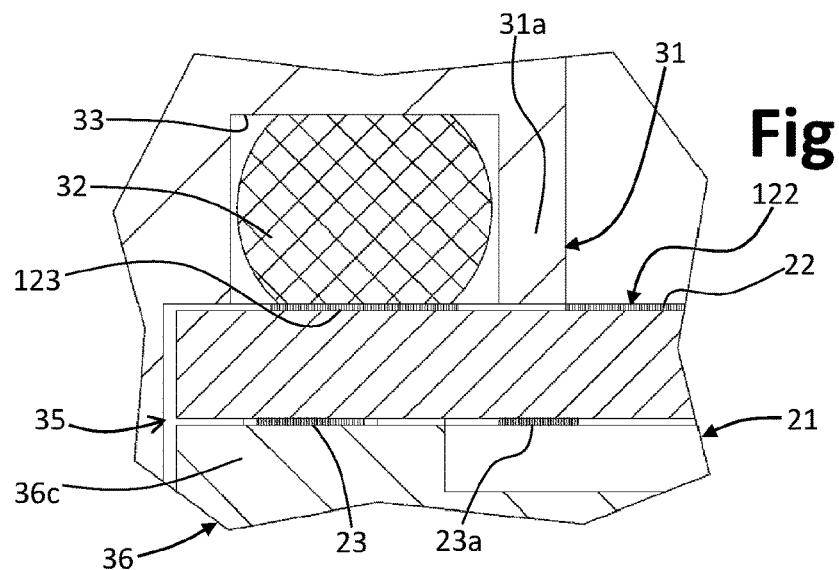
Fig. 30

ELECTROMAGNETIC MEASURING DEVICE FOR DETECTION OR CONTROL DEVICE FOR LIQUID CONDUCTING APPLIANCES

This application is the U.S. national phase of International Application No. PCT/IB2019/051238 filed Feb. 15, 2019 which designated the U.S. and claims priority to IT Patent Application No. 102018000002751 filed Feb. 16, 2018, the entire contents of each of which are hereby incorporated by reference.

FIELD OF THE INVENTION

The present invention relates to detection and/or control devices for liquid-conducting appliances and systems, such as devices for detecting and/or dispensing a liquid, or safety devices, in particular devices configured for connection between a generic source for supply of a liquid and an appliance using the aforesaid liquid. The invention may be applied in various sectors, such as the domestic sector, the hydro-sanitary sector, the air-conditioning sector, the vehicle sector.

More in particular, the invention regards a device of the above sort, which comprises at least:

a hydraulic body defining a duct for a flow of an electrically conductive liquid, the duct having an inlet and an outlet, and being defined at least in part of an electrically insulating material;

a flow sensor on the hydraulic body, which comprises:

an electromagnetic arrangement, configured for generating an electromagnetic field through the duct, in a direction transverse to the flow of the liquid, a detection arrangement, which comprises at least two electrodes for detecting a potential difference induced by the flow of the liquid through the electromagnetic field, the at least two electrodes being arranged for being in contact with the liquid.

PRIOR ART

Hydraulic detection and/or control devices for liquid-conducting appliances and systems, for example for electrical household appliances, are widely known.

In many solutions, the aforesaid devices have at least one hydraulic body provided with a flow sensor, for measuring an amount of a liquid delivered to the appliance or system served.

The flow sensor is in general of a mechanical type, based upon the use of an impeller set in rotation by the flow of the liquid and of a corresponding detection unit able to measure the rotational speed of the impeller, i.e., the number of revolutions thereof per unit time. For this purpose, the impeller typically includes one or more magnetic inserts, and the detection unit is usually of the Hall-effect type, set in a position aligned to the impeller, on the outside of the duct in which the water flows.

Known impeller flow sensors are potentially subject to imprecision of operation, for example on account of the presence of impurities in the water coming from a water mains supply, such as silt or iron residue, which may deposit over time between the blades of the impeller and the body that houses it and thereby cause sticking of the impeller itself. Known impeller sensors moreover envisage mechanical moving parts and are hence subject to inevitable wear, which can cause further imprecisions of detection. Impeller sensors are also far from suited to detecting very small flows of liquid (for example, of a few millilitres per minute), which may typically arise in the case of minor leakages or dripping from a valve arrangement set upstream or downstream of the flow sensor.

There have also been proposed electromagnetic-induction flow sensors, operation of which is based upon Faraday's law. In summary, for the purposes of operation of such a sensor, the flow of an electrically conductive liquid that flows in an electrically insulated duct of a given diameter is made to be traversed by a magnetic flux of a given density, in a direction substantially perpendicular to the one followed by the fluid. If the fluid is electrically conductive—as is typically mains water—in this way a potential difference is induced, which can be detected by means of two electrodes in contact with the fluid, which are aligned substantially perpendicular to the direction of the flow of the fluid and of the magnetic field. The value of the potential difference that can be measured via the electrodes is proportional to the average speed of the liquid in the duct: consequently, on the basis of the aforesaid value and on the basis of the size of the section of passage of the duct—which is known beforehand—it is possible to calculate the flowrate of the liquid through the duct.

Electromagnetic-induction flow sensors in general envisage that the electrodes, typically having an electrically conductive body of a cylindrical shape, are set on two opposite sides of the duct, facing one another and so that they can be reached by the liquid. Consequently, the two opposite sides of the duct must be provided with respective through openings for the electrodes, where the electrodes themselves are frequently drive-fitted so as to ensure autonomously fluid tightness. It is on the other hand known, and advisable, to apply in any case in an area corresponding to these openings a sealant material in order to prevent possible seepage of the liquid between the surfaces of the holes and the electrodes.

This type of embodiment complicates to a certain extent production of the hydraulic control device, which instead it would be desirable to simplify.

Aim and Summary of the Invention

In its general terms, the aim of the present invention is basically to provide a detection and/or control device of the type referred to above that is simple and inexpensive to produce, but distinguished by a high reliability of operation and detection.

The above and yet other aims, which will emerge more clearly hereinafter, are achieved, according to the present invention, by a detection and/or control device, in particular for liquid-conducting appliances and systems, having the characteristics referred to in the annexed claims.

The claims form an integral part of the technical teaching provided herein in relation to the invention.

In summary, the flow sensor of the detection and/or control device according to the invention is an electromagnetic-induction flow sensor, which comprises an electromagnetic arrangement, pre-arranged for generating an electromagnetic field in a direction transverse to the flow of the liquid that flows between the inlet and the outlet of a duct defined by a hydraulic body of the device. The sensor further comprises a detection arrangement, which includes at least two electrical detection elements, for example in the form of electrodes or tracks of electrically conductive material (for instance, made at least in part of metal or of pastes or materials with a graphite or carbon base), for detecting a potential difference induced by the flow of the liquid through the electromagnetic field. The two electrical detection elements are arranged so as to be able to come into contact with the liquid the flowrate of which is to be measured.

According to the invention, the flow sensor includes a support or substrate, associated to which are the at least two electrical detection elements, in particular set at a distance apart from one another on the substrate. As will be seen, this type of embodiment simplifies production and assembly of the flow sensor. In various preferential embodiments, the substrate is a planar and/or relatively stiff and straight substrate, for example constituted by a printed-circuit board (PCB), preferably but not necessarily a double-sided or multilayer PCB.

Once again according to the invention, the two electrical detection elements are associated to one and the same face of the substrate, with the latter that extends substantially on the outside of the duct for the liquid, in a position corresponding to a first side of the duct itself. The hydraulic body has at least two through openings, at the aforesaid first side of the duct, which are each located in a position corresponding to a respective electrical detection element: in this way, each electrical detection element faces at least in part the inside of the duct through the corresponding through opening, and can thus be reached by the liquid that flows in the corresponding duct. This solution simplifies further production and assembly of the flow sensor, as well as production of the substrate, which does not need to be designed for being immersed to a substantial degree in the liquid.

In various preferential embodiments, associated to the through openings are sealing means, operatively set between the substrate, or a corresponding electrical detection element, and an outer surface of the first side of the duct. The presence of the sealing means enables increase in the reliability of the device, preventing the risks of leakages of the liquid outside the duct, at the aforesaid through openings.

In various preferential embodiments, the device according to the invention comprises a positioning arrangement, which is configured for urging at least one portion of the substrate towards the aforesaid outer surface of the first side of the duct. In this way, in addition to favouring correct positioning of the substrate and of the electrical detection elements with respect to the corresponding through openings, it is possible to obtain also an elastic compression of the sealing means, such to improve the characteristics of tightness. Preferably, the sealing means associated to each through opening comprise an annular gasket, preferably made of elastomeric material. Components of this type are widespread and inexpensive, to the advantage of reduction in the overall costs of the device. Not excluded, on the other hand, is the use of sealing elements configured in some other way, for example moulded or deposited locally or on parts of the device, such as gaskets overmoulded on the hydraulic body or deposited layers of an adhesive or a sealant material.

In various embodiments, the positioning arrangement comprises at least one positioning insert and a corresponding housing, defined in the hydraulic body and delimited at least in part by the aforesaid outer surface of the first side of the duct. The housing is configured for receiving at least a corresponding portion of the substrate associated to which are the at least two electrical detection elements, as well as at least a corresponding portion of the positioning insert. The positioning insert is, instead, configured for being fixed in a working position within the housing, with the aforesaid portion of the substrate that is in an intermediate position between the insert itself and the aforesaid outer surface of the first side of the duct. In this working position, part of the substrate is urged towards the outer surface of the first side of the duct, as mentioned above. This type of embodiment simplifies further production and assembly of the device, and at the same time increases the quality of fluid tightness at the through openings.

In various embodiments, the hydraulic body of the device defines, at the aforesaid outer surface of the first side of the duct, at least one of a seat for the sealing means associated to a respective through opening and a tubular projection that delimits an end portion of a corresponding through opening. The presence of the seat and/or of the tubular projection guarantees proper positioning of the sealing means, in addition to simplifying assembly of the device. For this purpose, preferably, the hydraulic body defines both the seat and the tubular projection, in which case the former may comprise an annular recess that surrounds the latter.

In various embodiments, the electromagnetic arrangement of the flow sensor has a generally U-shaped configuration and comprises two magnetic-pole parts, generated between which is an electromagnetic field, the two magnetic-pole parts being connected together, preferably by means of a core provided on which is an electrical coil. The two magnetic-pole parts extend generally parallel to one another, on the outside of the duct for the liquid, with a first magnetic-pole part at the aforesaid first side of the duct and with the second magnetic-pole part at a second side of the duct that is opposite to the first side.

Preferably, in the case of an electromagnetic arrangement of this sort, the housing forming part of the aforesaid positioning arrangement can also receive at least a corresponding portion of one of the magnetic-pole parts, in an intermediate position between the positioning insert and the corresponding portion of the substrate. In this way, the positioning arrangement—and in particular its insert and/or its means for blocking it in position—can advantageously be exploited also to guarantee the correct working position of at least part of the electromagnetic arrangement, and in particular of one of its magnetic-pole parts.

Preferably, the positioning insert can be slidably inserted in the corresponding housing, with the insert that defines or has associated respective means for fixing or blocking thereof in the working position. Mounting of the insert is in this way simple, fast, and intuitive.

In various embodiments, the positioning insert and the corresponding housing define respective inclined planes, configured for co-operating together during insertion of the former into the latter: in this way, the insert can urge in a wedge-like fashion the corresponding portion of the substrate towards the outer surface of the first side of the duct, in a simple and effective way, in particular with a substantially perpendicular thrust on the substrate, or at least on the areas corresponding to the electrical detection elements and/or to the corresponding sealing elements.

In various embodiments, the means used for blocking or fixing the positioning insert in the corresponding working position comprise engagement means, for example of a fast-coupling or elastic or snap-in type, preferably configured for enabling the insert to be engaged in position following upon one and the same movement performed for inserting the insert into the housing, as far as its working position. An engagement of this type may comprise, for example, at least one engagement element associated to, or defined by, the positioning insert, which can be engaged in a corresponding engagement seat associated to, or defined by, the housing or the hydraulic body. The aforesaid engagement seat may, for example, include a toothed sector, which extends in an axial direction of the housing, i.e., the direction of insertion of the insert into the housing.

Alternatively, fixing in position may be obtained by means of at least one angularly movable blocking member, i.e., a blocking member designed to rotate, preferably a threaded blocking member that can be screwed into a respective through opening of the positioning insert, in such a way that a front end of the blocking member will urge a portion of the substrate towards the aforesaid outer surface of the first side of the duct and a surface of the positioning insert, opposite to the front end of the blocking member, will, instead, be urged towards a corresponding contrast surface of the housing. This embodiment enables increase in the quality of positioning and fluid tightness, in particular when two threaded members are provided in positions substantially corresponding to the electrical detection elements and/or to the corresponding sealing means. Alternatively, fixing in position may be obtained via at least one threaded positioning and blocking member, which can be screwed into a respective through hole of the hydraulic body in such a way that a front end of the blocking member will urge a portion of the substrate towards the aforesaid outer surface of the first side of the duct.

In general, in various embodiments, at least one of the positioning insert and a corresponding blocking member is/are configured to exert a force or thrust in a direction generally perpendicular to the axis of the duct and/or of the detection support.

In various embodiments, also an arrangement or a sensor may be provided for measuring the magnitude of the magnetic field generated by the electromagnetic arrangement, preferably substantially at, or in the proximity of, the electrical elements used for detecting the potential difference. This measurement arrangement may comprise a coil or a winding, preferably located in the proximity of the substrate or on the substrate itself that carries the electrical detection elements (for example, in the form of spiral-shaped tracks etched or deposited on the substrate, or possibly in the form of a coil made of wire, such as a coil mounted on the substrate), in such a way that, in the mounted condition of the flow sensor, also the coil or winding is located within the magnetic field generated by the electromagnetic arrangement.

Alternatively, the aforesaid arrangement or sensor for measuring the magnetic field could be of a Hall-effect type, for example comprising an electronic chip mounted on a detection support, such as the same substrate of the electrical detection elements. Also such a Hall-effect sensor or such a coil could then be advantageously mounted on the outside of the duct, for example at a corresponding seat provided in the hydraulic body. The aforesaid measurement arrangement (or sensor) may be used, for example, for detecting possible unforeseeable variations of the magnetic field.

BRIEF DESCRIPTION OF THE DRAWINGS

Further purposes, characteristics, and advantages of the invention will emerge clearly from the ensuing detailed description, with reference to the annexed drawings, which are provided purely by way of explanatory and non-limiting example and in which:

FIG. 7 is a sectioned perspective view of a device according to possible embodiments of the invention;

FIGS. 8, 9, and 10 are schematic cross-sectional views, according to mutually orthogonal planes, of a device according to possible embodiments of the invention;

FIGS. 21, 22, and 23 are schematic views, respectively, in front elevation, side elevation, and rear elevation, of a detection arrangement of a device according to possible variant embodiments of the invention;

FIG. 24 is a partial and schematic cross-sectional view of a device according to the invention that uses the detection arrangement of FIGS. 21-23;

FIG. 25 is a detail at a larger scale of FIG. 24; and

FIGS. 26, 27, 28, 29, and 30 are views similar to those of FIGS. 21, 22, 23, 24, and 25, respectively, corresponding to another device according to the invention.

DETAILED DESCRIPTION OF PREFERRED EMBODIMENTS OF THE INVENTION

Reference to "an embodiment", "one embodiment", "various embodiments", and the like in the course of this description is meant to indicate that at least one particular configuration, structure, or characteristic described in relation to an embodiment is comprised in at least one embodiment. Hence, phrases such as "in an embodiment", "in one embodiment", "in various embodiments", and the like that may be present in various points of this description do not necessarily refer to one and the same embodiment, but may, instead, refer to different embodiments. Moreover, particular conformations, structures, or characteristics defined in the course of this description may be combined in any adequate way in one or more embodiments, even different from the ones represented. The reference numbers and spatial references (such as "upper", "lower", "top", "bottom", "front", "back", "vertical", etc.) used herein, in particular with reference to the examples in the figures, are only provided for convenience and hence do not define the sphere of protection or the scope of the embodiments. In the present description and in the attached claims, the generic term "liquid" is to be understood as comprising water or other liquids used in the domestic field or on vehicles, including mixtures and solutions containing water and/or other liquids. Likewise, the generic definition "liquid-conducting appliances and systems" must be understood as comprising all those devices, appliances, installations, and systems that are supplied or that, more in general, use or envisage circulation or storage of at least one liquid. In the figures, the same reference numbers are used to designate elements that are similar or technically equivalent to one another.

Figure 1:
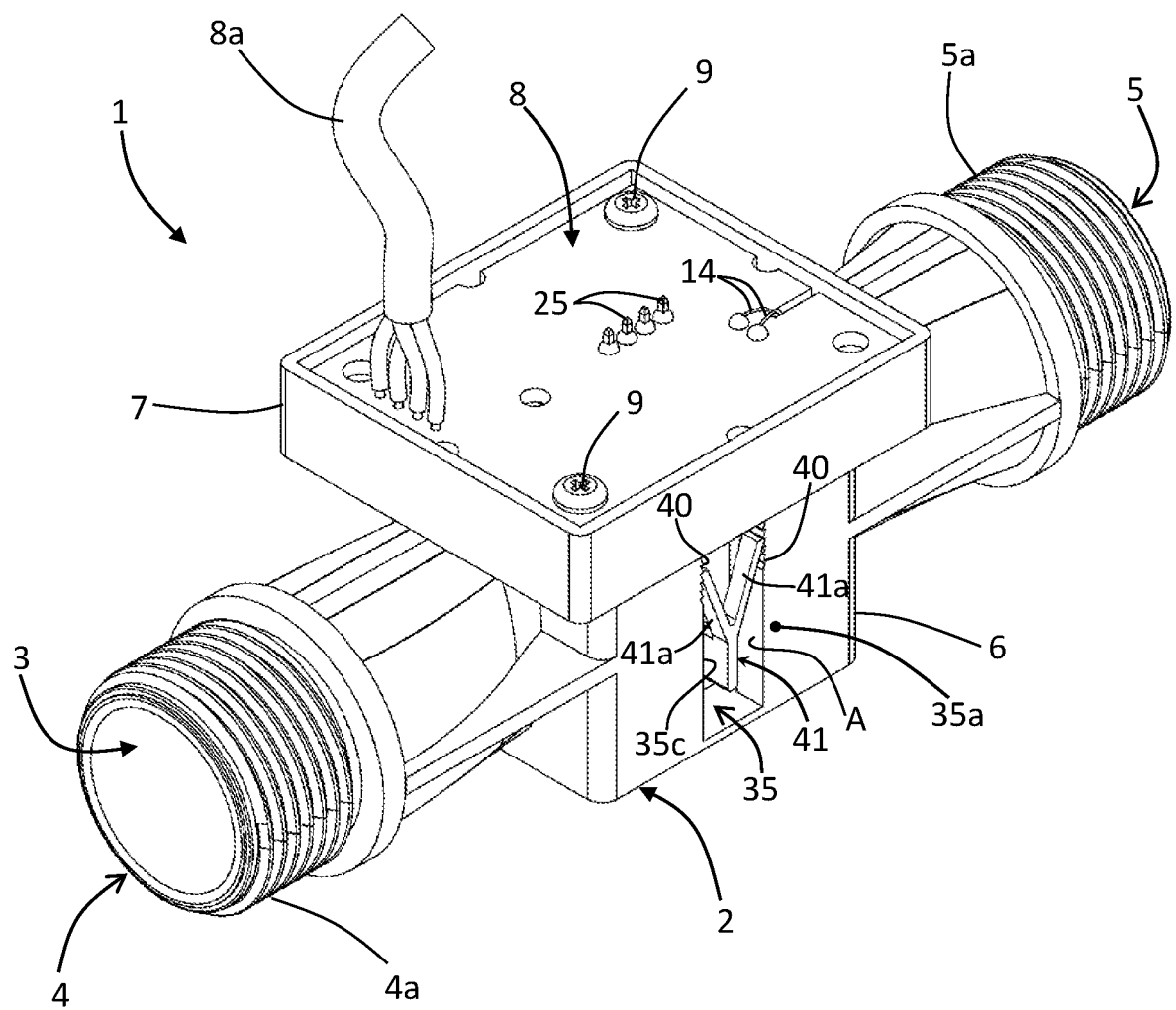
FIG. 1 is a schematic perspective view of a detection and/or control device according to possible embodiments of the invention.

Represented schematically in FIG. 1 is a detection and/or control device according to possible embodiments of the invention, pre-arranged for the purposes of detecting a flow of a liquid, i.e., for measuring a flowrate or amount of the aforesaid liquid, as described hereinafter. In what follows, it is to be assumed that this device, designated by 1, is used for the purposes of measuring the volume of a generic electrically conductive liquid at inlet to an appliance or system served, for example water of a domestic network supplied to an electrical household appliance.

The device 1 has a hydraulic body 2, preferably made of electrically insulating material, for example a thermoplastic material. In various embodiments, such as the one exemplified, the body 2 is made of a single moulded piece, but in other embodiments the body 2 may be made up of a number of distinct pieces joined together, for example welded.

The hydraulic body 2 defines a duct 3 for the flow of a liquid, having at least an inlet 4 and an outlet 5. For this purpose, the body 2 defines an inlet fitting 4a, for example designed for connection to a source of the liquid, and an outlet fitting 5a, for example designed for connection to a liquid-conducting appliance or system, in which the liquid circulates or which must be fed with the liquid supplied through the aforesaid source. In the example, the fittings 4a and 5a extend substantially according to one and the same axis, but in other embodiments they may be angled with respect to one another.

Once again with reference to the non-limiting example illustrated, the fittings 4a and 5a are threaded fittings, but other fitting arrangements are obviously possible, for example based upon the use of rotatable ringnuts and/or bayonet couplings and/or pins or cotter pins, preferably comprising corresponding engagement seats and/or reliefs.

The device 1 integrates in the hydraulic body 2 a flow sensor, designed to generate signals or information representing the speed, and hence the flowrate or amount of the flow of liquid that flows in the duct 3, it being possible for the aforesaid signals or information to be used, for example, by a control system of the appliance or system served. For example, the information that can be acquired from the flow sensor may be used by the aforesaid control system, such as the control system of an electrical household appliance, for the purposes of measurement and/or dosage of the amount of a liquid that is to be loaded each time, in particular for carrying out a treatment program, and/or for detecting leakages or faults of closing of a corresponding loading electro-valve.

To return to FIG. 1, the hydraulic body 2 defines—in an intermediate position between the fittings 4a and 5a—a first substantially boxlike portion 6, which preferably surrounds the duct 3 and a second substantially boxlike portion 7, in a lateral position with respect to the duct 3, which preferably overlies the portion 6, both of the portions 6 and 7 having respective cavities.

Preferably, the two portions 6 and 7 are made of electrically insulating material, for example a thermoplastic material, and are made of a single piece, it being possible on the other hand for them to be also configured as distinct parts. In various embodiments, such as the one exemplified, at least one of the first portion 6 and the second portion 7 is made of a single piece with the body 2, in particular a single moulded piece, but in other embodiments the portion 6, the portion 7, and the body 2 may be at least in part provided via a number of distinct pieces joined together, for example welded or engaged or glued.

Mounted preferably at the portion 7 is a circuit support, for example a printed-circuit board (PCB), mounted on which are electrical and/or electronic components, designated as a whole by 8, and preferably connected to which are an electromagnetic arrangement and a detection arrangement of the type mentioned previously.

Figure 2:
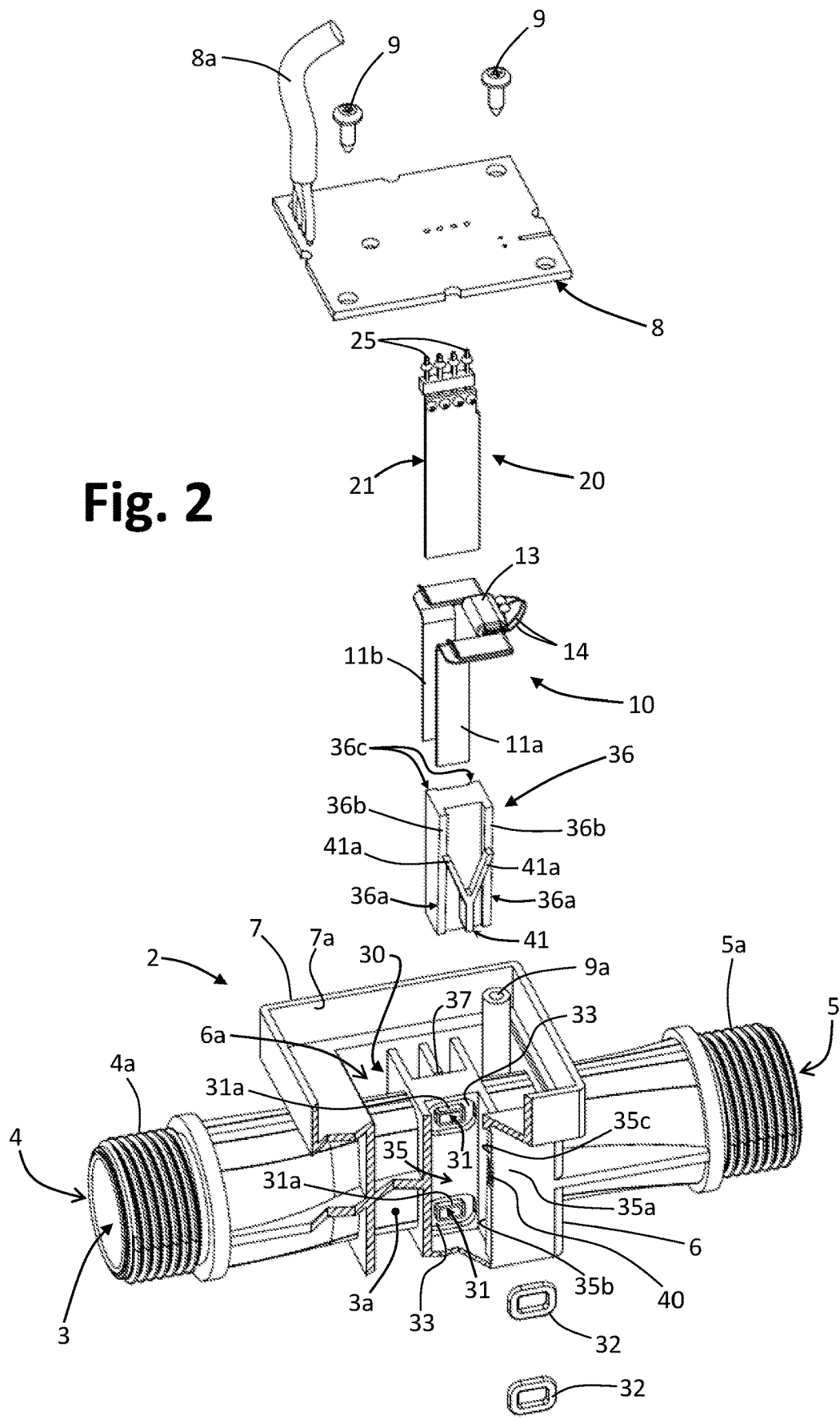
FIG. 2 is a partially exploded schematic view of a device according to possible embodiments of the invention.
Figure 3:
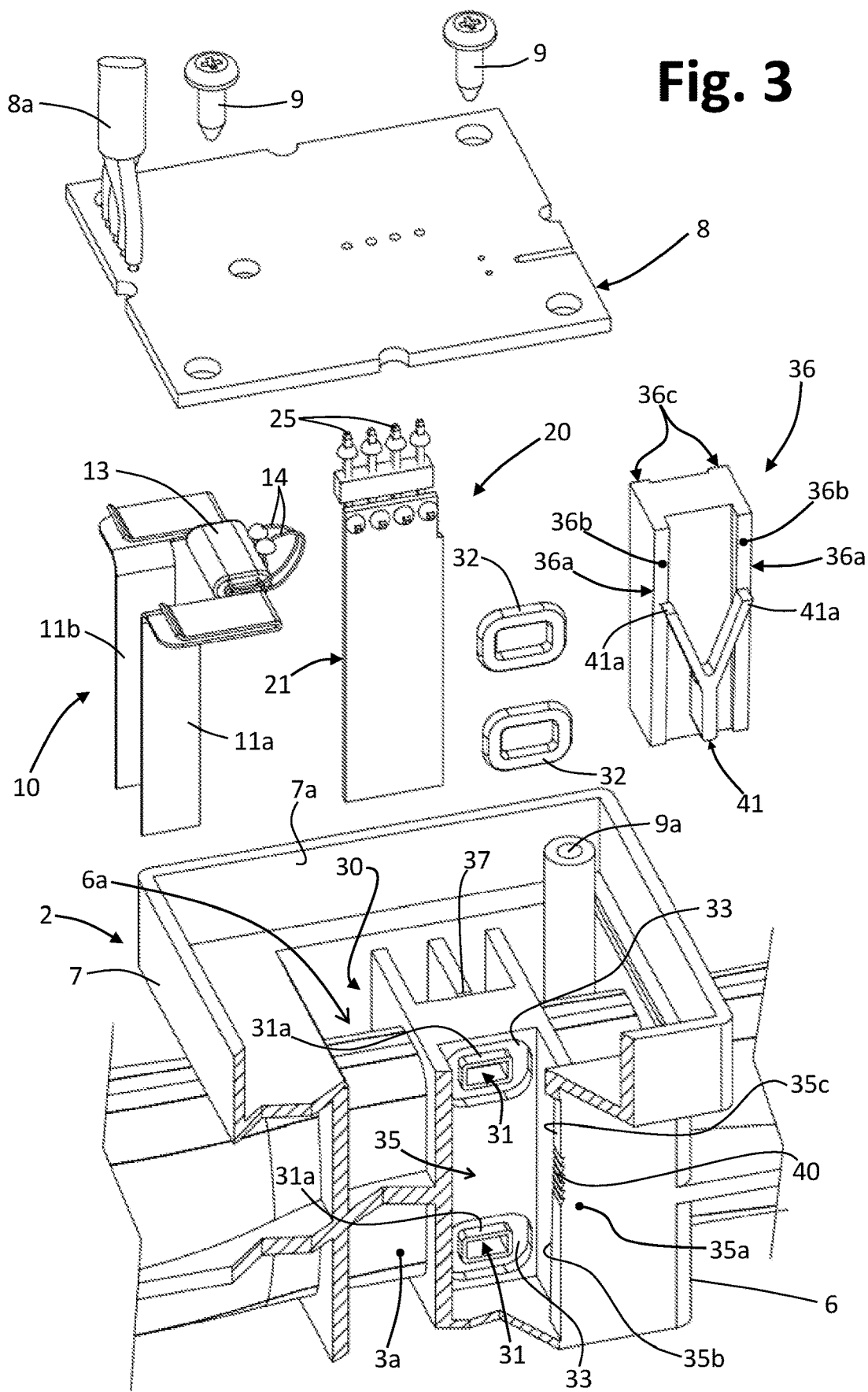
FIG. 3 is a schematic perspective view at a larger scale of some parts of the device of FIG. 2.

The circuit support 8 may be fixed in position in any known way, for example via screws 9 that engage in corresponding seats defined by the body 2 (one of these seats is visible, for example, in FIGS. 2-3 and is designated by 9a). Electrically connected to the circuit support 8 are the leads of a cable 8a, for carrying a supply voltage and/or signals, for example signals representing the detections of flow.

Visible in FIGS. 2 and 3 are the circuit support 8, as well as an electromagnetic arrangement and a detection arrangement that can be used in a device according to the invention and are designated as a whole by 10 and 20, respectively. On the circuit support 8 there may, for example, be provided the various electrical and electronic components for conditioning and processing the signals generated via the detection arrangement 20, as well as for supply of a coil of the electromagnetic arrangement 10 (and possibly for control of valve means, when the device 1 envisages them).

Figure 4:
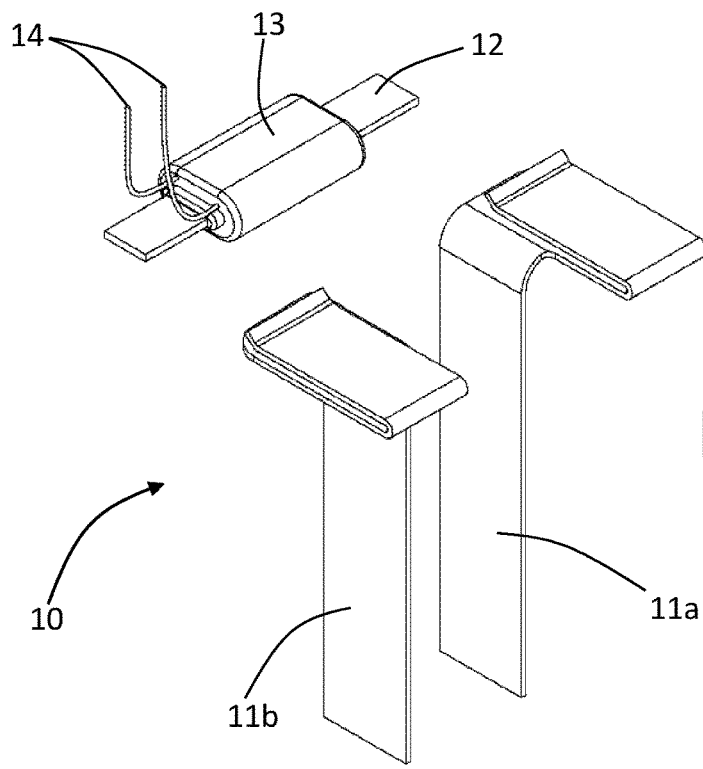
FIG. 4 is a partially exploded schematic view of an electromagnetic arrangement of a device according to possible embodiments of the invention.

An example of electromagnetic arrangement 10 is represented schematically also in FIG. 4. As already mentioned, in various embodiments, this arrangement has a generally U-shaped configuration: for this purpose, in various embodiments, the arrangement 10 comprises two magnetic-pole parts 11a and 11b—also referred to hereinafter as "magnetic poles" or simply "poles"—made of ferromagnetic material, which are generally parallel and/or symmetrical, and are connected together by means of a core 12, which is also made of ferromagnetic material, arranged or wound on which is an electrical coil 13, with corresponding supply conductors 14, for example provided for connection to the circuit support 8 of FIG. 1. The core 12 may advantageously be made of materials with high remanent magnetization (semihard materials). The poles 11a and 11b are preferably the same as one another. Preferably, the poles and/or the core are/is in the form of a plate, preferably shaped.

Figure 5:
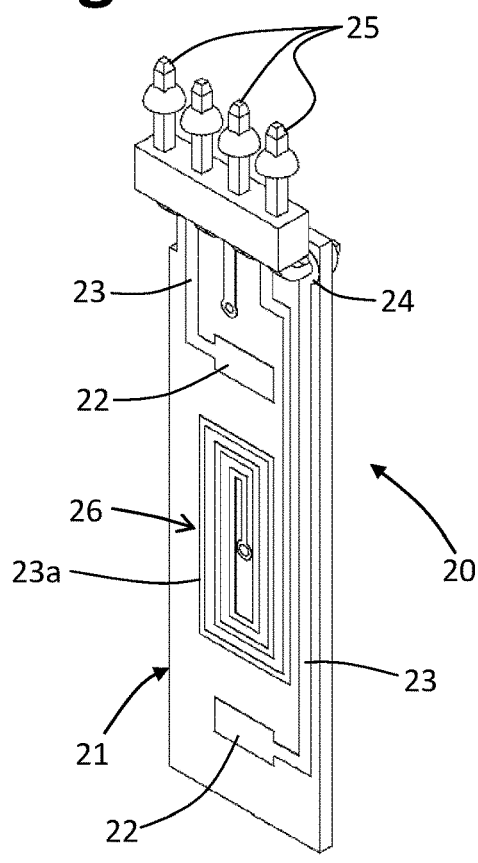
FIGS. 5 and 6 are schematic views, respectively, a perspective view and a front elevation, of a detection arrangement of a device according to possible embodiments of the invention.
Figure 6:
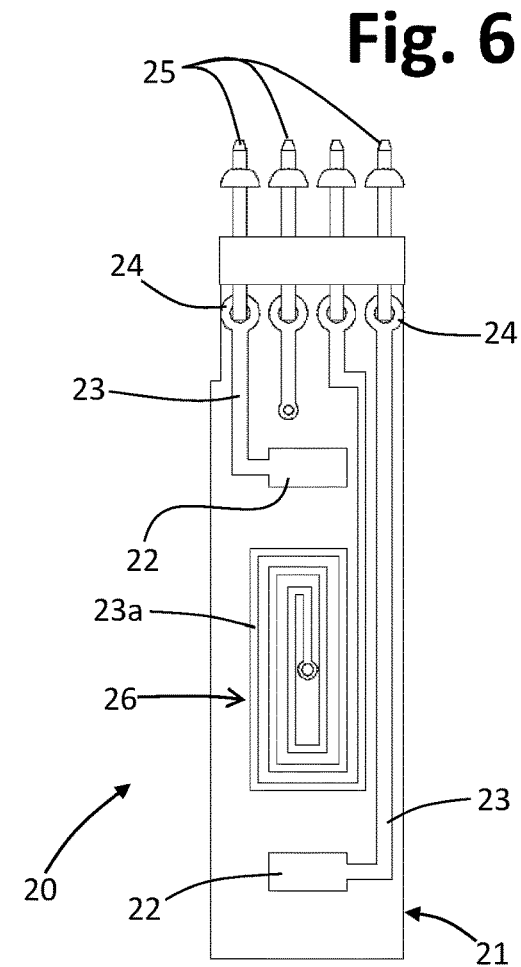

An example of detection arrangement 20 is, instead, represented schematically in FIGS. 5 and 6. In the example, this arrangement comprises a substrate or support 21, preferably planar and relatively stiff and straight, made of electrically insulating material. The substrate 21 may, for example, be made of plastic, or ceramic, or composite material (for example, of the type known as FR4), or combinations of a number of different materials. As has been said, the substrate 21 may, for example, be constituted by a standard PCB, possibly of a double-sided or multilayer type.

Present on one and the same face of the substrate 21 are two electrodes 22, which are preferably planar, and, preferably, conductive tracks 23 and connection pads 24, which are also preferably planar. The electrodes 22 may be defined by pads or terminal portions of respective tracks 23 and preferably have a substantially rectangular or oblong peripheral profile, even though this shape is not imperative (the electrodes 22 could, for example, have a polygonal shape or a shape with a curve or rounded profile, such as a circular or oval shape). As it can be appreciated, the electrodes each have a front and a back, the back of the electrodes being associated to the above said one and the same face of the substrate, and the front of the electrodes being instead designed to come into contact with the liquid subject to detection.

The electrodes, tracks, and pads may be deposited, preferably using screen-printing or deposition techniques (for example, using inks with a base of carbon or graphite or metals) or obtained with etching techniques. As will be clarified hereinafter, in various embodiments, the electrodes 22 provide the aforementioned electrical detection elements, used for the purposes of measuring the potential difference, which represents a value of flowrate of liquid in the duct 3. The electrodes 22 are set at a distance apart from one another in an axial or longitudinal direction of the substrate 21 and, in the mounted condition of the sensor, are aligned to one another in a direction substantially perpendicular to the flow of the liquid and to the magnetic field generated via the arrangement 10.

In various embodiments, the various conductive tracks 23 define, at their respective proximal ends, the connection pads 24, electrically connected to which are, for example via soldering, respective electrical terminals 25, used, for instance, for connection to the circuit support 8 of FIG. 1.

In various embodiments, the substrate 21 may also be provided with an arrangement or a sensor for measuring the magnetic field induced by the electromagnetic arrangement 10. In the case exemplified in FIGS. 5-6, a measurement coil is provided for this purpose, designated by 26, which comprises a corresponding conductive track 23a with spiral arrangement, preferably in a substantially intermediate position between the electrodes 22, combined to which is a further conductive track, not visible, for electrical connection with the centre of the coil itself, such as a track provided on the opposite face of the substrate 21 (such a further conductive track is, for example, visible in FIGS. 21 and 26 and is designated by 23b).

The coil 26 (or a Hall-effect sensor that replaces it) can advantageously be used for providing a direct feedback of the magnitude of the magnetic field generated by the arrangement 10 in the area of the electrodes 22, and thereby providing a signal useful for evaluating the presence of possible variations or problems of the electromagnetic system, such as variations due to production tolerances and/or ageing and/or temperature variations or faults following upon damage to the device 1. Also the coil 26 may be defined on the face of the substrate 21 at which the electrodes 22 are located. On the other hand, the coil 26 could also be defined on the opposite face of the substrate (as in the variants of FIGS. 21-23 and 26-28) and/or at least in part within the substrate 21, when the latter is of a multilayer type. Also the tracks 23 could extend at least in part within the substrate when this has a multilayer structure, with just the electrodes 22 exposed.

In FIG. 3 it may be noted how the boxlike portion 7 defines a cavity 7a, which can receive at least the circuit support 8 and at least part of the terminals 25 for connection of the substrate 21, and of the conductors 14 for connection of the coil 13. Also the boxlike portion 6 is preferably provided with a corresponding cavity 6a, within which the hydraulic body 2 is preferably shaped so as to define a site or formation 30 for positioning the electromagnetic arrangement 10 and the detection arrangement 20.

In the example represented, at one side 3a of the duct 3, in particular a major side of the duct, the hydraulic body 2 has at least two through openings 31, which, in the assembled condition of the device 1, are each set in a position corresponding to a respective electrode 22 of the substrate 21: as may be appreciated, in this way, the front of each electrode 22 faces at least in part the inside of the duct 3, through the corresponding opening 31. In the example shown in FIG. 2, the through openings 31 have a substantially rectangular or oblong cross section, in a way similar to the electrodes 22, even though this shape is not imperative. Hence, as it can be seen in the figure, in the assembled condition the electrodes have no parts which mutually face each other, within the duct, or they do not substantially protrudes within the duct for the liquid, being them substantially flush with the inner surface of the duct or possibly slightly recessed with respect to said surface.

Associated to the openings 31 are sealing means, designed to be operatively set between the substrate 21 and the outer surface of the side 3a of the duct 3, i.e., of the hydraulic body 2. Preferably, as in the example, the aforesaid sealing means—designated by 32—are constituted by annular gaskets, very preferably made of elastomeric, and hence elastically compressible, material. It will be appreciated that, instead of providing two distinct sealing elements 32 to be associated each to a respective opening 31, there may be provided a sealing element in common for the two openings 31, for example formed by a layer of elastomeric material provided with two holes corresponding to the openings 31.

The gaskets 32, both in the case of gaskets distinct from one another and in the case of gaskets joined together to form a single element, could advantageously be over-moulded on, or co-moulded with, at least one of the hydraulic body 2 and the substrate 21.

In various embodiments, at least one gasket 32 adheres in a fluid-tight way to the outer surface of the side 3a of the duct 3. In various embodiments, at least one gasket 32 adheres in a fluid-tight way to at least one electrically insulating surface of the substrate 21, and/or to a track 23 thereof and/or to an electrode 22 thereof. This at least one gasket 32 may, for example, be glued to, or overmoulded on, or co-moulded with, the hydraulic body 2, or else the substrate 21.

Preferably, as illustrated in FIG. 3, the hydraulic body 2 defines, at the outer surface of the side 3a, at least one of a seat 33 and a tubular projection 31a that delimits an end portion of a corresponding through opening 31. In this seat 33 and/or around this projection 31a there may be provided (fitted or moulded or glued or welded) a corresponding annular sealing element 32. The head edge of the projections 31a may possibly provide a contrast element for the front of the substrate 21.

The seats 33 are preferably constituted by an annular recess of the outer surface of the side 3a of the duct, such as a recess that surrounds a respective tubular projection 31. In the example, the seats 33 hence have an annular profile, substantially mating with, or at least in part complementary to, that of the gaskets 32, or in any case designed to house the gaskets 32 at least in part.

As has been mentioned, in various embodiments, the device 1 has a positioning arrangement, which is configured for urging at least one portion of the substrate 21 towards the outer surface of the side 3a of the duct 3. In the example shown in FIG. 3, for this purpose, defined in a position corresponding to the side 3a of the duct 3, in the portion 6 of the body 2, in particular within the formation 30, is a housing or seat 35, which preferably extends axially in a direction generally perpendicular to the duct 3. The housing 35, visible only partially in FIG. 3, is configured for receiving at least partially a positioning insert, designated by 36, as well as at least one corresponding portion of the substrate 21 where the electrodes 22 are located.

The insert 36 and the substrate 21 may be inserted in the housing 35, which, for this purpose, is open at at least one longitudinal end thereof (the upper end, as viewed in FIGS. 2 and 3).

In various embodiments, the housing 35 is delimited at least in part by the outer surface of the side 3a of the duct 3, in particular in the area where the openings 31 open out. In this way, the insert 36 can be inserted and blocked in a working position thereof within the housing 35, with the corresponding portion of the substrate 21 carrying the electrodes 22 that is in an intermediate position between the insert itself and the openings 31. In this working position, the insert 36 urges the aforesaid portion of the substrate 21 towards the outer surface of the side 3a of the duct, in particular towards the seats 33 and/or towards the head edge of the tubular projections 31a, with the electrodes 22 facing or at least partially inserted in the openings 31: this characteristic may be appreciated, for example, from FIG. 7 (even though the openings 31 are not visible in the cross-sectional view of this figure), FIG. 8, and FIG. 11.

In various embodiments, the electromagnetic arrangement 10 may be inserted at least partially within the cavity 6a of the portion 6 of the hydraulic body 2, or in any case in such a way that the two magnetic poles 11a and 11b generally parallel to one another are located on the outside of the duct 3, the pole 11a being at the side 3a of the duct itself, and the other pole 11b being, instead, at the opposite side of the duct, designated by 3b, for example, in FIGS. 6-9. It should be noted that the details designated by 31b in FIG. 10 represent the bottom of the impressions that, during production of the hydraulic body 1, are formed following upon definition of the through openings 31: see, for reference, also FIG. 9 (these details are not in any case essential elements, it being possible for the aforesaid impressions to have a different shape, as may be appreciated, for example, from the embodiments of FIGS. 19 and 20).

Figure 9:
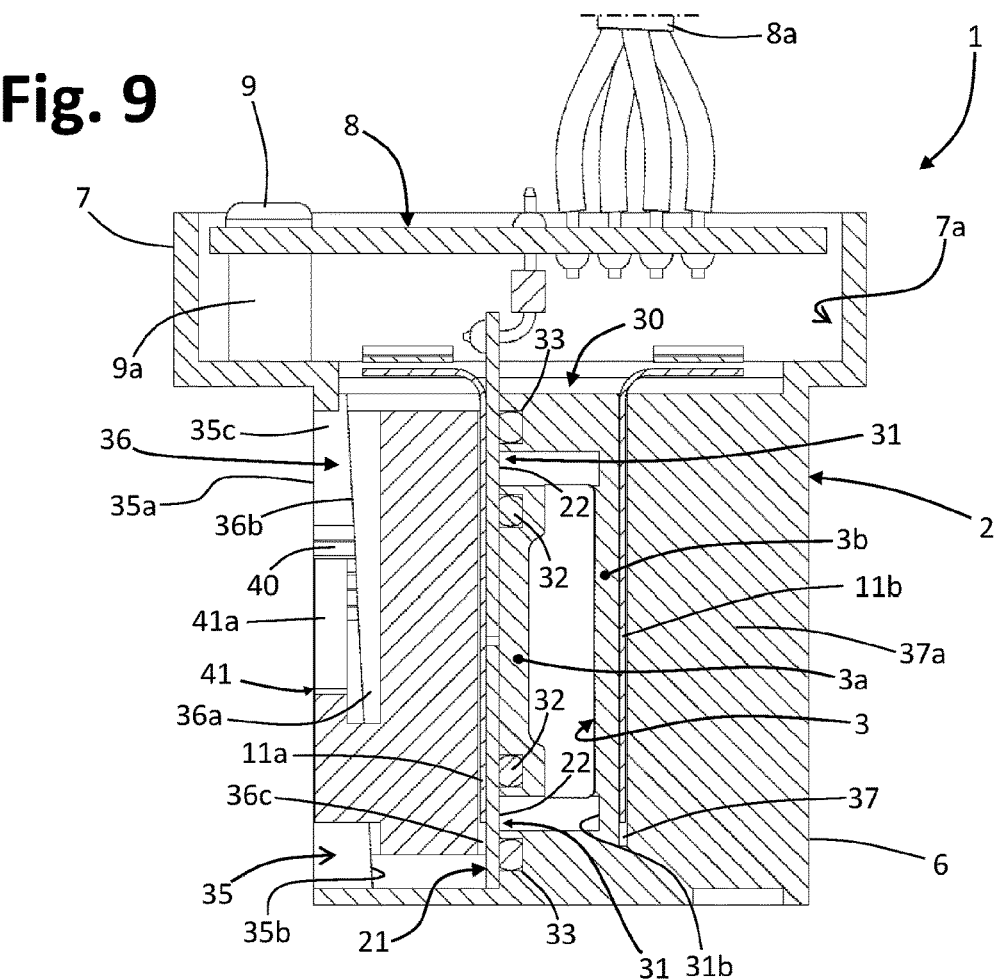
Figure 10:
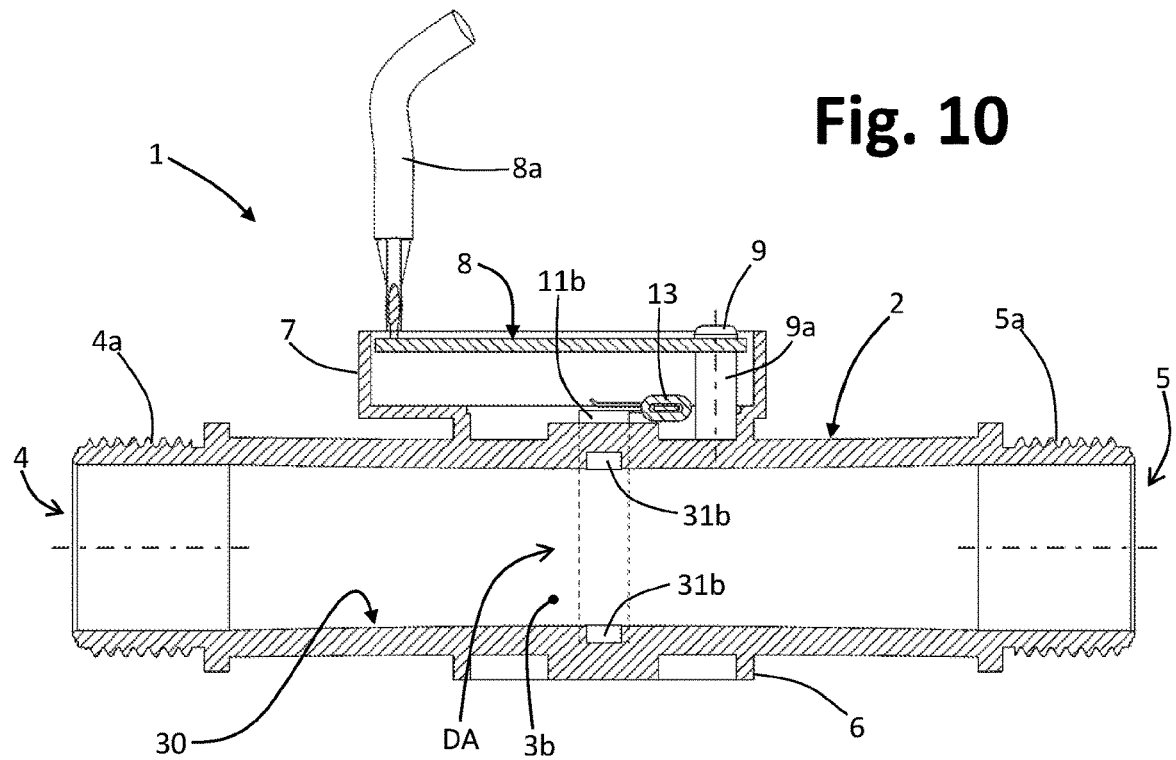
Figure 11:
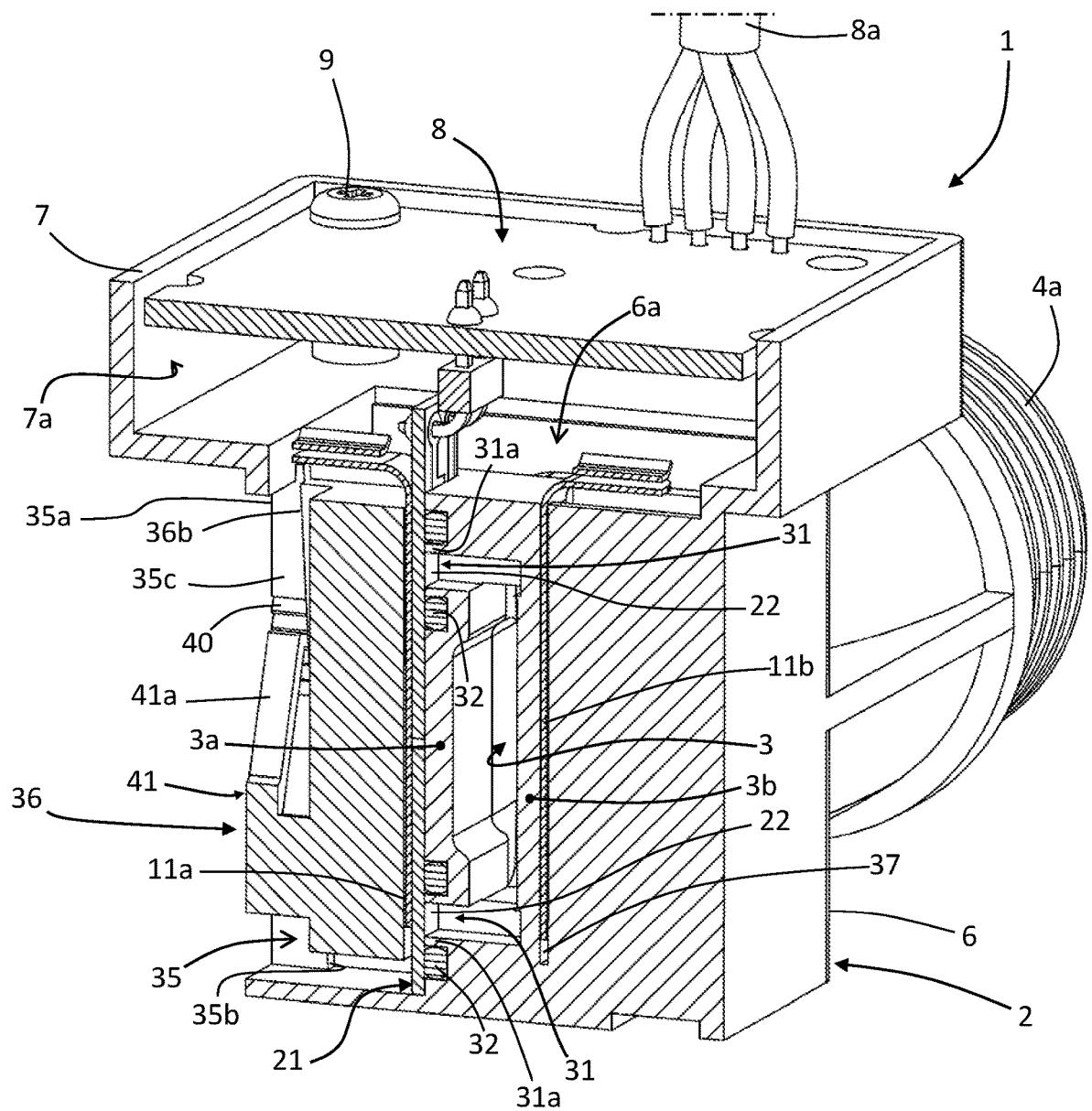
FIG. 11 is a sectioned perspective view of a device according to possible embodiments of the invention.

From FIGS. 8, 9, and 11 it may be noted how, advantageously, the pole 11a may be partially inserted in the housing 35 in such a way that a corresponding portion thereof is in an intermediate position between the insert 36 and the substrate 21. For the purposes of positioning of the other pole 11b, at the side 3b of the duct, the hydraulic body 2 may define a corresponding seat, such as the one designated by 37 in FIGS. 3, 7, and 8.

In the example illustrated, the seat 37 is defined via at least three parallel walls of the formation 30, visible in FIG. 3 but not designated by any reference number (only the central wall, which is lower than the side walls, is designated by 37a in FIGS. 8 and 9), but it is evident that the seat for the pole 11b may be defined in some other way, for example, via a slit in the body 2, i.e., in the formation 30, designed to receive within it part of the pole in question.

Preferably, the insert 36 can be slidably inserted into its housing 35 according to an axial direction of the latter (with reference to the example illustrated in the figures, the insert 36 may be inserted from above into the housing 35). Preferably, the width of the housing 35, defined by two corresponding preferably plane surfaces, is slightly greater than the width of the insert 36, defined by two corresponding preferably plane surfaces, in particular to obtain an insertion sufficiently guided in the axial direction.

In various preferential embodiments, the insert 36 and the housing 35 define respective inclined planes, configured for co-operating together during insertion of the former into the latter, in such a way that the insert 36 will be urged towards the outer surface of the side 3a of the duct 3, and consequently will urge the substrate 21, with the possible pole 11a set in between, towards the outer surface of the side 3a of the duct 3, i.e., so as to compress the gaskets 32 for the purposes of fluid tightness.

The insert 36, preferably of a generally prismatic shape, has at least one said inclined plane at its back, i.e., its face or surface opposite to the one designed to face the side 3a of the duct 3, whereas the housing 35 defines at least one corresponding inclined plane on a wall or surface thereof that is generally opposite to, or faces, the side 3a of the duct 3.

In the case illustrated in FIG. 3, the insert 36 has two inclined planes, designated by 36b, defined by two small projecting and parallel rear walls 36a, which extend in the longitudinal direction of the insert itself (i.e., in the direction of insertion of the insert 36 into the housing 35). On the other side, the housing 35 defines two corresponding inclined planes 35b (only one of which is visible in FIG. 3), which are defined by a wall 35a thereof generally opposite to the side 3a of the duct 3: see for reference also FIGS. 7, 9, and 11.

In various embodiments, the insert of the positioning arrangement may be used also for purposes of positioning and fixing of the magnetic pole 11a. For example, as in the case illustrated in FIG. 3, the insert 36 may define small projecting and parallel walls, for example like the ones designated by 36c, at its front.

The dimensions and distance of the above walls 36c, when envisaged, are preferably chosen so as to define in between a sort of longitudinal seat, for positioning a respective portion of the pole 11a: the concept can be clearly appreciated, for example, from FIG. 8, where it may likewise be noted how, in the mounted condition of the flow sensor, the back of the substrate 21 rests on the front end of the walls 36c (which here does preferably not define any inclined plane), whereas the front of the substrate 21 may rest on the outer surface of the side 3a, in particular on the end of the tubular projections 31a (only one of which is visible in FIG. 8).

As may be clearly appreciated from FIGS. 7 and 11, the insert 36 may be inserted from above into the housing 35, in such a way that—thanks to sliding of the inclined planes 36b on the inclined planes 35b—the insert itself will operate as a wedge, in the sense of pushing the substrate 21, and thereby also the pole 11a, towards the side 3a of the duct 3. Insertion proceeds until a final working position of the insert 36 is reached, where the insert keeps the substrate 21 pressed against the side 3a of the duct, in particular but not necessarily against the head end of the tubular projections 31a, in a condition of partial elastic compression of the seal gaskets 32.

In various embodiments, the positioning insert is secured in its working position via an engagement arrangement, preferably of a fast-coupling or elastic or snap-in type, exploiting the same movement performed for inserting the insert into the corresponding housing. Such an engagement arrangement may comprise, for example, at least one engagement element on the insert, preferably made of a single piece with the insert itself, and a corresponding engagement seat on the hydraulic body.

With reference to the example of embodiment of FIG. 3, the housing 35 preferably has a discontinuity or opening (designated by A only in FIG. 1) of its wall 35a, with the opposite longitudinal edges of the opening—designated by 35c in FIGS. 3, 7, and 11—that face one another. Defined on these facing edges (or possibly on other opposite walls inside the housing 35) are respective engagement elements 40, for example constituted by toothed sectors, i.e., a series of reliefs and cavities, which extend in the axial direction of the housing 35, i.e., the direction of insertion of the insert into the housing.

The engagement elements 40 may be engaged by an engagement element 41, provided in the part rear of the insert 36, which comprises corresponding engagement teeth 41a, here defined by two at least partially elastic tabs, which in the example of FIG. 3 diverge upwards. The teeth 41a, or the tabs that define them, are set, in a condition of elastic bending, between the opposed edges 35c carrying the toothed sector 40. As may be appreciated, during insertion of the insert 36 into the housing 35, the teeth 41a, i.e., the upper ends of the tabs, are pressed elastically on the opposed edges 35c (FIG. 3) of the opening A (FIG. 1) so that they slide thereon and then engage on the toothed sector 40 until the working position is reached, where the insert will be withheld, as represented in FIGS. 7-9 and 11.

In various embodiments, the duct defined by the hydraulic body of the device according to the invention has a detection region, at which the flow sensor is installed, and in this detection region the section of passage of the duct varies upstream and downstream of the position of the electrodes for measuring the potential difference.

In the case exemplified—see in particular FIG. 8—the aforesaid detection region comprises an area IN for inlet for the liquid, the section of passage of which, or at least one dimension in width of the duct 3, decreases or narrows as far as an adjacent detection area DA, at which the electrodes 22 are located, followed by an adjacent area OUT for outlet of the liquid, the section of passage of which, or at least one dimension in width of the duct 3, again widens, preferably substantially until it reaches its original section (for example, the same section of passage at the inlet 4 and at the outlet 5).

The section of passage in the detection area DA, or at least a dimension in width of the duct 3, is preferably smaller or restricted with respect to at least one of the initial section of passage of the inlet area IN and the final section of passage of the outlet area OUT, preferably with respect to both. Variation of the section of passage in the detection region, in particular reduction of the section in the area DA, presents the advantage that the speed of the flow of the liquid increases at the detection area DA where the electrodes 22, are located, and, consequently, in this area an increased effect of charge separation following upon application of the magnetic field is obtained, which facilitates detection of the potential difference.

In various embodiments, the cross section of the duct 3 or of the detection area DA is a substantially oblong, as may be appreciated, for example, in FIGS. 7, 9, and 11, and the substrate 21 is located at this area, on the outside of the duct 3, in a direction substantially parallel to the major dimension of the aforesaid oblong cross section. This oblong cross section may be at least approximately elliptical or rectangular, in such a way that the electrodes 22 can be positioned as far possible from one another, at the detection area DA. The distance between the electrodes 22 enables increase in the sensitivity of measurement of the potential difference.

The flow sensor that equips the device 1 operates according to modalities in themselves known.

For the purposes of flowrate detection, the coil 13 of the electromagnetic arrangement 10 is supplied, thus creating a magnetic field in the poles 11a and 11b that closes through the detection area DA of the duct 3, thereby traversing the flow of the electrically conductive liquid between the inlet 4 and the outlet 5 of the duct itself (which is here assumed as being mains water).

The presence of a magnetic field transverse to the flow of the water causes the electrical charges present in the water (ions) to be subjected to an electromagnetic force that pushes them in opposite directions according to their positive or negative charge. Displacement of the electrical charges is present only if the flowrate of water is other than zero, and the degree of displacement of the charges is proportional to the flowrate; i.e., the greater the flowrate of water, the greater the amount of electrical charges that will displace. Displacement of the electrical charges at the sides of the detection area DA creates a potential difference between the electrodes 22 present on the substrate 21, which is proportional to the rate of the flow passing through the magnetic field.

The signal across the electrodes 22 reaches the circuit support 8 (via the corresponding conductive tracks 23, pads 24, and terminals 25—FIGS. 4-5), where it is processed and/or amplified via the electrical and/or electronic components present on the support 8 (for example, integrated circuits or chips, such as operational circuits and/or amplifiers and/or microcontrollers or application-specific integrated circuits—ASICs—or digital signal processors—DSPs—and memory circuits).

The processed and/or amplified electrical signal, representing the flow speed or the value of flowrate is, for example, transmitted by the circuit of the support 8 to the control system of the appliance or system served, for example an electrical household appliance, via the wiring 8.

It should be noted that the modalities of amplification and/or conditioning and/or processing and/or transmission of the signals or data may be implemented in any known way. For example, preferably, calculation of the value of flowrate on the basis of the potential difference detected at the electrodes 22 and of the parameters known beforehand (size of the section of passage in the detection area DA and magnitude of the magnetic field generated by the arrangement 10) may be carried out by purposely provided componentry at least in part present on the circuit support 8 (for example, via a microcontroller) and sent to the aforesaid control system, for example a signal in the form of binary code or a signal variable in voltage and/or frequency. On the other hand, not excluded from the scope of the invention are solutions in which the value of the potential difference, appropriately amplified, is directly sent to the aforesaid control system, where calculation of the flowrate or flow amount is carried out on the basis of the aforesaid parameters known beforehand.

In any case, on the basis of the value of flowrate, the control logic is able to measure the amount of water that has passed through the device 1, with this system that may consequently control other devices; for example, it may interrupt supply of the water when a pre-set amount of water is reached, in particular by driving closing of an electrovalve upstream or downstream of the device 1.

As has been mentioned, in various embodiments, also provided on the substrate 21 is a magnetic-field sensor, represented by the coil 26 (FIGS. 5-6), which is set in a position substantially corresponding to, or in the proximity of, the electrodes 22, and in any case within the magnetic field generated by the arrangement 10. Across this coil a potential difference will hence be detectable, which represents the magnitude of the magnetic field produced by the magnetic poles 11a and 11b. This electrical value may, for example, be processed by the electric/electronic componentry present on the circuit support 8—preferably comprising at least one electronic controller and nonvolatile memory means—in order to have available information on the effective magnitude of the magnetic field in the area of the electrodes 22 and thus have the possibility of evaluating the presence of possible problems or variations of the electromagnetic system. Information of this type can be transmitted in the form of signal to the control system of the liquid-conducting appliance or system served, for example for giving warning of possible operating faults of the device 1.

Also the signal across the coil 26 reaches the circuit support 8 (via the corresponding conductive tracks, pads, and terminals), where it is processed and/or amplified via the electronic components present on the support itself. For this purpose, the electronic circuit implemented on the support 8 preferably comprises one or more integrated circuits or chips for detecting the magnetic field (such as operational circuits and/or amplifiers and/or microcontrollers or application-specific integrated circuits—ASICs—or digital signal processors—DSPs—and memory circuits).

The information on the effective magnitude of the magnetic field, as measured by the coil 26 (or magnetic sensor that replaces it) may be advantageously used by the control logic (whether it is implemented on the circuit support 8 or in the control system of the appliance or system served) for the purposes of calculation of the value of flowrate, i.e., with a logic of an adaptive type, whereby the value representing the magnitude of the magnetic field is a parameter that can be updated each time on the basis of the measurements made via the coil.

As mentioned, in various preferred embodiments, at least the core 12 may be made of a semihard material, i.e., a material with high remanent magnetization. Materials of this type enable the magnetic field to persist for a certain time also when supply to the coil 13 ceases, which is advantageous in view of the reduction of consumption of electric power, in particular when the device 1 envisages an autonomous electric-power source (such as a battery, as described hereinafter). For example, in various embodiments, the pulses for supply of the coil 13 of the arrangement 10 occur in short time intervals, preferably shorter than one second (for example, 750 ms): use of a semihard material makes it possible to apply such a pulse having a duration of microseconds and guarantee persistence of the magnetic field for the rest of the time required. As may be appreciated, this enables energy saving, which is useful in the case of electrical supply with a battery or the like.

Possibly, using a semihard material for the core 12, the control electronics of the electromagnetic arrangement 10 can be pre-arranged for supplying the coil 13 in order to generate a first magnetic field, and then interrupting supply, in any case guaranteeing persistence of a certain magnetic field for a certain length of time following upon interruption of supply; preferably—but not necessarily—the control electronics may also be pre-arranged for measuring the magnetic field that persists in the aforesaid length of time (for example, via the aforementioned measurement coil or the aforesaid Hall-effect sensor) to establish decay thereof with the coil 13 not supplied, for example in order to compensate the measurements of magnetic field and/or to establish when to re-activate supply to the coil 13.

In the embodiments exemplified previously, the electrical detection elements 22 of the flow sensor are constituted by electrodes that are substantially planar or have a reduced thickness, but this does not constitute an essential characteristic, it being possible for these elements, in fact, to have a substantially three-dimensional body or a body with a thickness that is greater, for example, than that of the tracks 23 and the pads 24 on the substrate 21.

Figure 12:
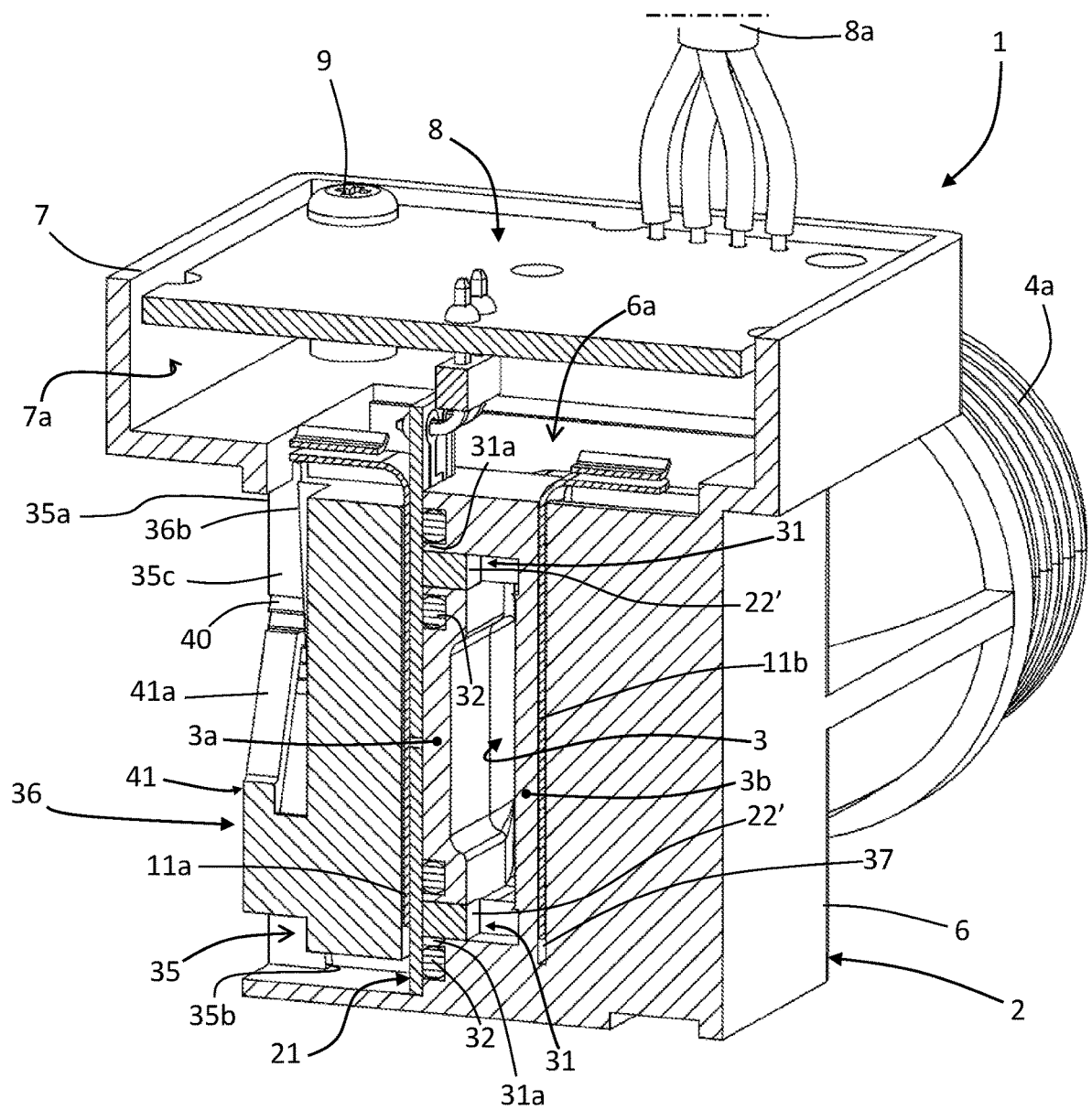
FIGS. 12 and 13 are views similar to those of FIG. 11, corresponding to possible variant embodiments of the invention.

For instance, in FIG. 12 a variant embodiment is illustrated, whereby electrical detection elements or electrodes are provided—designated by 22'—having a substantially prismatic shape, the back of which is electrically in contact with (possibly soldered to) corresponding electrically conductive pads or tracks present on the substrate 21, for example of the type already designated in FIGS. 4-5 by 22 and 23.

In the example, the elements or electrodes 22' have a substantially parallelepipedal shape, i.e., with a substantially rectangular cross section, possibly with rounded corners, and are at least partially inserted in the through openings 31 so that they can come into contact with the liquid, each at its front, as can be seen in FIG. 12. As can be seen, also in this case, in the assembled condition, the electrodes 22' do not have mutually facing parts within the duct 3a.

The electrodes 22' may possibly be drive-fitted and/or glued in the openings 31 in order to achieve autonomously fluid tightness. It is in any case preferable to provide further sealing means of the types mentioned previously, for example, the annular gaskets 32 already described, designed to ensure tightness following upon their axial compression, as described previously.

Figure 13:
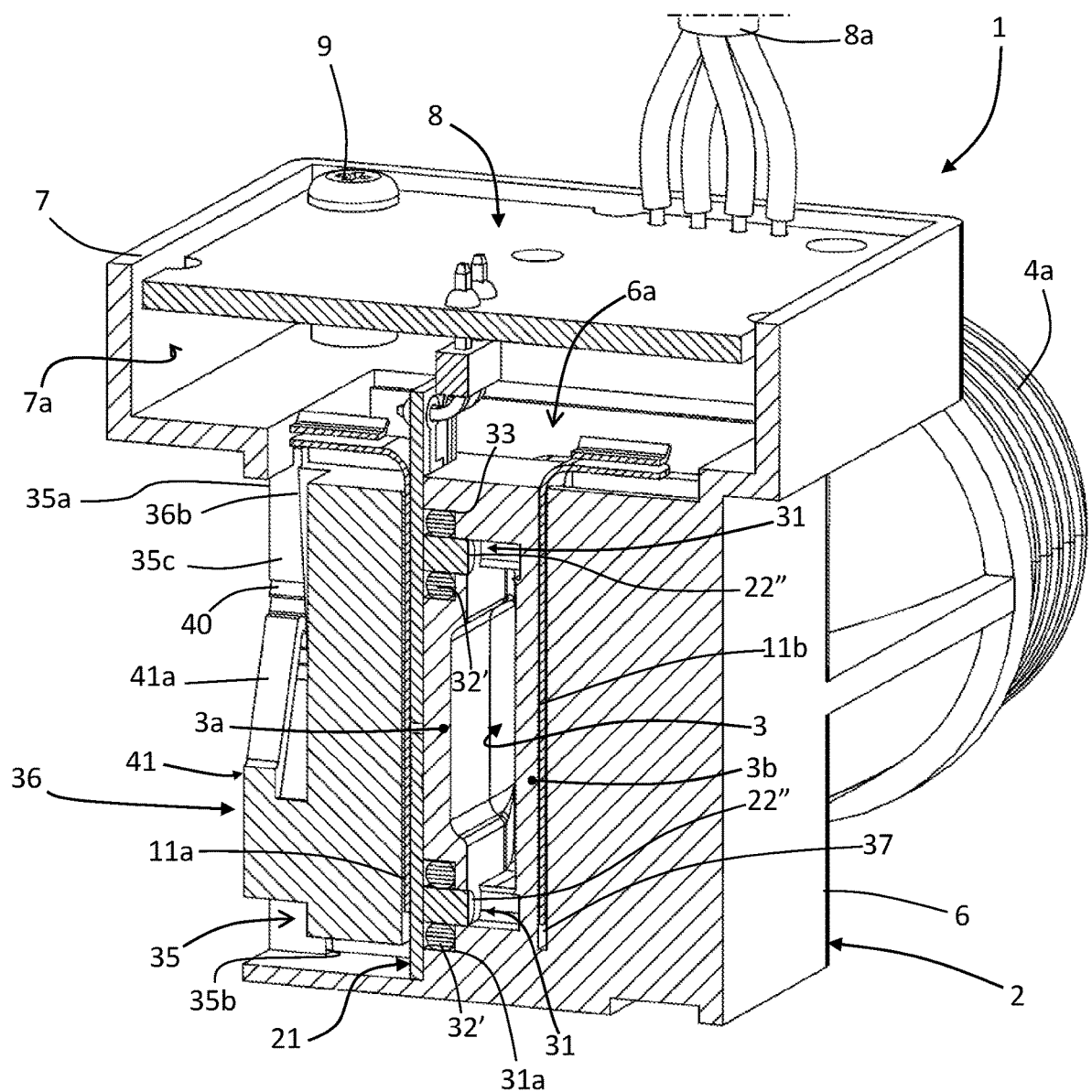

FIG. 13 illustrates a further possible variant embodiment, whereby electrical detection elements are provided, designated by 22", having a substantially cylindrical shape, the back of which is likewise in electrical contact with (for example, soldered to) corresponding electrically conductive tracks or pads present on the substrate 21, of the type already designated in FIGS. 4-5 by 22 and 23. Also in this embodiment, the elements or electrodes 22" are at least partially inserted in the through openings 31 so as to come into contact with the liquid at the front thereof; also in this case, in the assembled condition, the electrodes 22" do not have in practice any mutually facing parts within the duct 3a.

Also the electrodes 22' may possibly be drive-fitted and/or glued in the openings 31 in order achieve autonomously fluid tightness, but it is in any case preferable to provide also in this case sealing means made of elastic or elastomeric material. In the example, annular gaskets 32' are provided for this purpose, which here are preferably circular, in particular for coupling in a fluid-tight way on the circular section of the electrodes 22". It should be noted that the gaskets 32' are here designed to provide tightness in a radial direction, preferably following upon their radial compression, both on the cylindrical surface of the electrodes 22" and on the surface of the opening 31 or of a corresponding circular seat 33; for this reason, the tubular projections 31a described with reference to the previous embodiments are not present, and the seats 33 are open in a radial direction towards the openings 31.

It should be noted that, in addition or as an alternative to the gaskets 32 or 32' described previously, the sealing means used could include a sealant material applied locally, for example a resin (epoxy, or acrylic, or mono or bi-component resin), or a polymer overmoulding, preferably designed to be compressed via the substrate 21, as described previously.

FIGS. 14-21 illustrate further possible embodiments of a hydraulic control device according to the invention.

Figure 14:
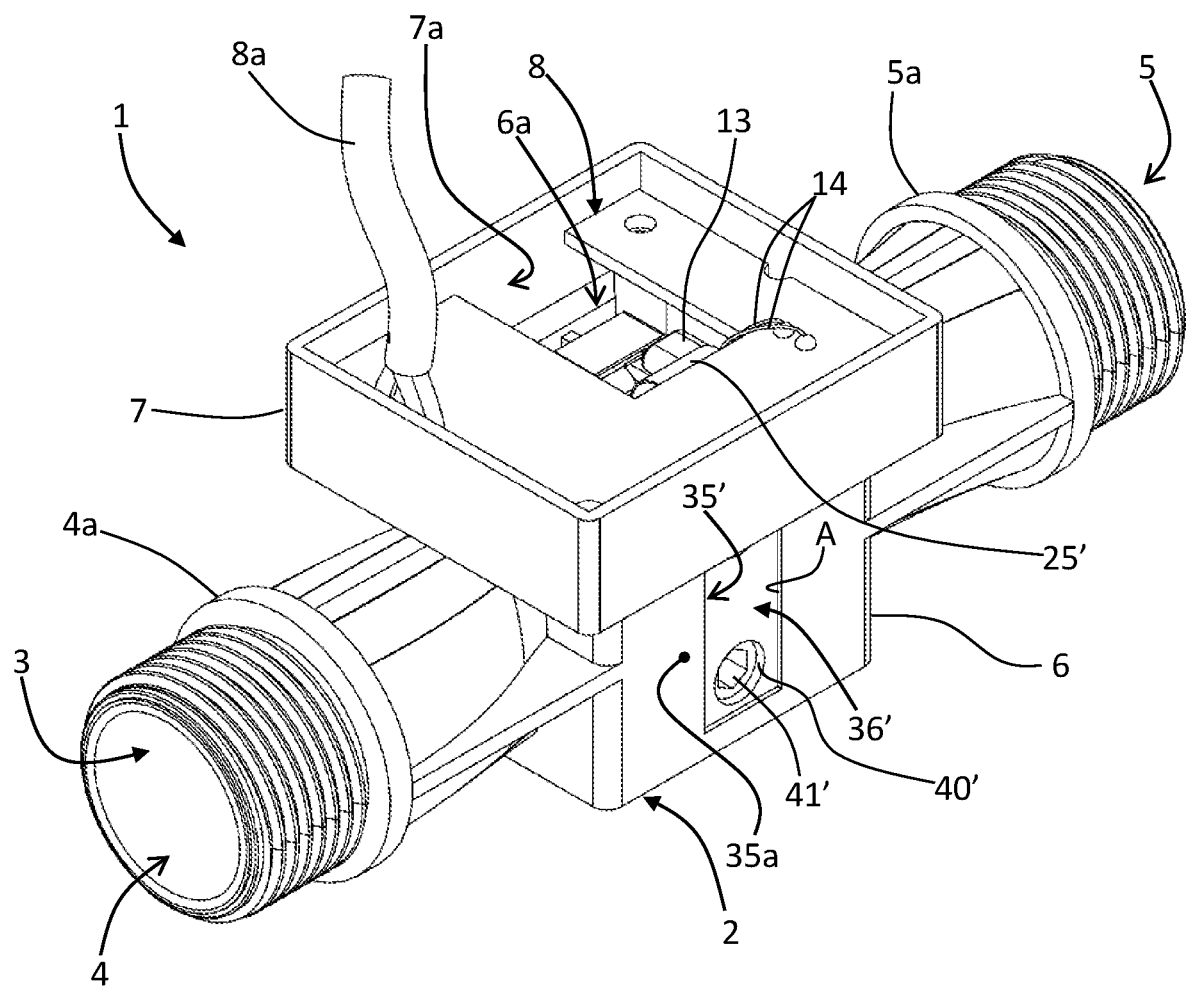
FIG. 14 is a schematic perspective view of a device according to other possible embodiments of the invention.

As may be noted from FIG. 14, the general structure of the device 1 is substantially similar to the one described previously, albeit with a different embodiment of the positioning arrangement, in particular of the means used for blocking or fixing of the positioning insert, designated by 36', within the corresponding housing, designated by 35'. It should be noted that at least some of the characteristics described with reference to the embodiments of FIGS. 14-21 may be at least combined with characteristics described with reference to the embodiments of FIGS. 1-13, and vice versa.

Figure 15:
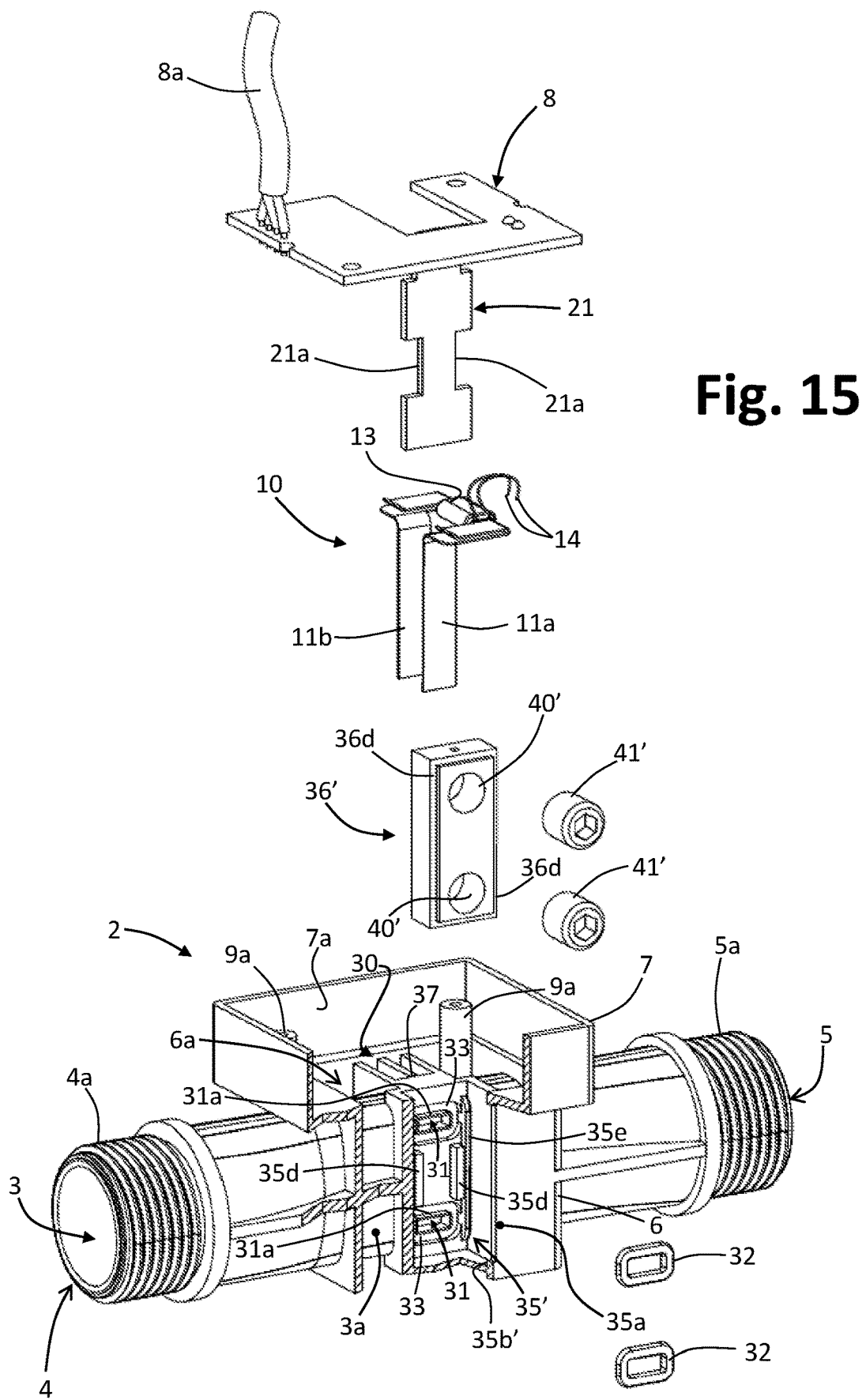
FIG. 15 is a partially exploded schematic view of a device according to other possible embodiments of the invention.
Figure 16:
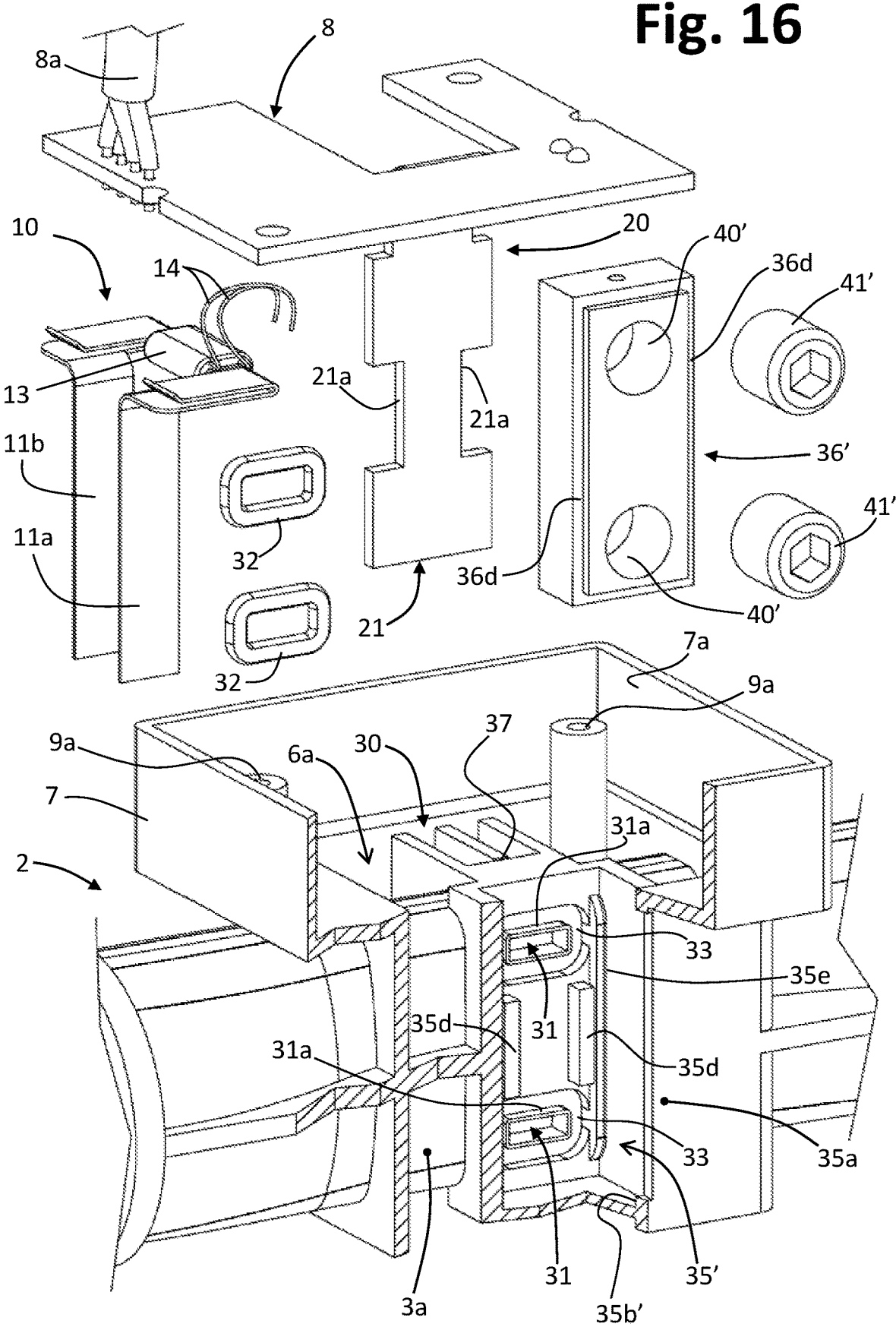
FIG. 16 is a schematic perspective view at a larger scale of some parts of the device of FIG. 15.
Figure 17:
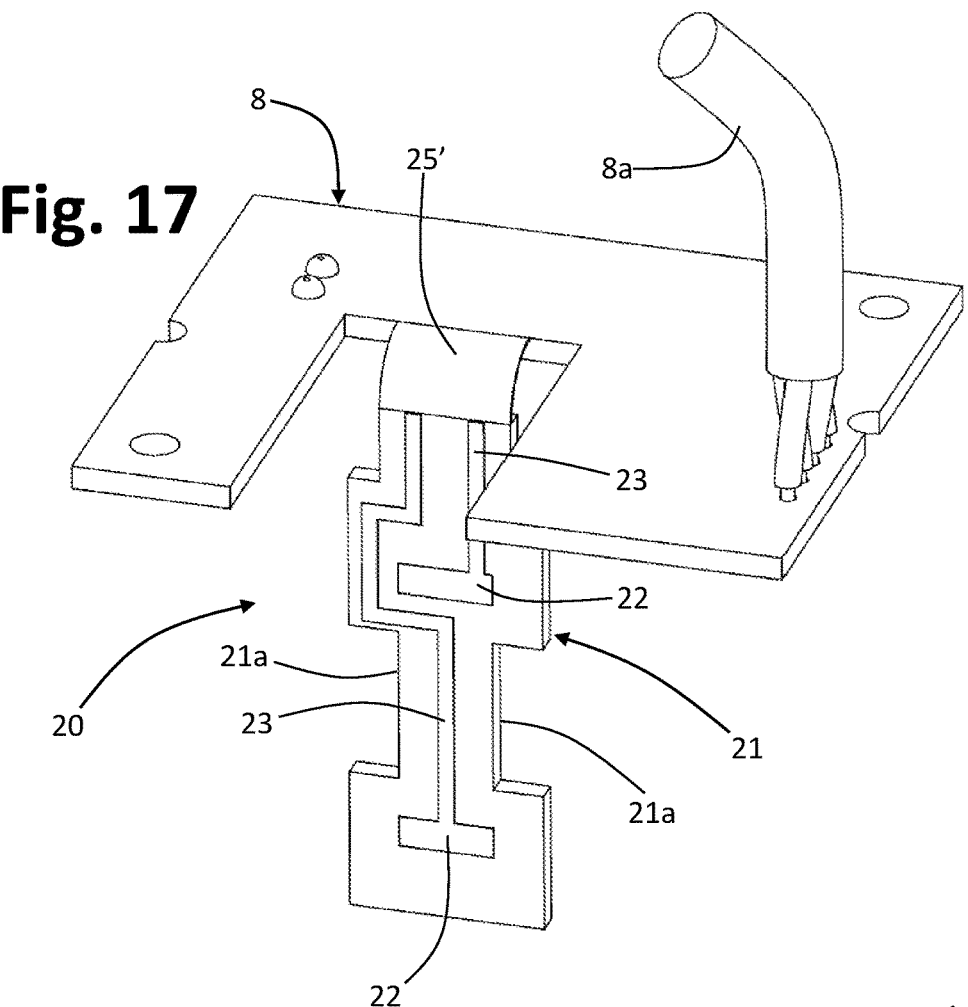
FIG. 17 is a schematic perspective view of a flow-detection assembly of a device according to other possible embodiments of the invention, associated to a circuit support.

As may be noted from FIGS. 15-17, the outer profile of the detection arrangement 20, i.e., of its substrate 21, may slightly differ from what has been described previously. In particular, as may be noted from FIGS. 15-17, in various embodiments, the profile of the substrate 21 may include at least one intermediate recess, in an area comprised between the two electrodes 22, for example, to improve further positioning of the substrate 21 in combination with purposely designed positioning elements or reliefs provided within the housing 35'. In the example illustrated, two opposed recesses 21*a* are provided, designed to co-operate with two substantially parallel positioning reliefs, designated by 35*d* in FIG. 16, provided at the outer surface of the side 3*a* of the duct 3, which are preferably defined integrally by the hydraulic body 2 itself and have substantially a peripheral profile at least in part corresponding or complementary to that of the recesses 21*a*. As may be appreciated, for the purposes of assembly, the substrate 21 may be positioned in the housing 35' in such a way that each recess 21*a* is engaged by a corresponding relief 35*d* so as to improve the quality of positioning. As has been mentioned, this solution may be adopted also in the embodiments described previously.

From FIG. 17 it may likewise be noted how, in various embodiments, the substrate 21, or its electrically conductive tracks 23, may be connected to the circuit support 8 via a flexible multipolar flat cable, or else via a flexible printed-circuit board (PCB) comprising a flexible substrate with flexible electrical tracks, designated by 25'. Also this solution can be adopted in the embodiments described previously. It is, for example, possible to provide a single electronic circuit comprising at least two portions movable with respect to one another, in particular so as to assume different inclinations and/or so that they can be positioned on surfaces or in planes different from one another.

As may be noted once again from FIG. 16, also in the case of this example, the tubular projections 31*a* and/or seats 33 may be provided for the seal rings 32, at the outer surface of the side 3*a* of the duct 3 (it being possible, however, for these projections to be absent, as in the case of the previous embodiments). In this case, preferably, the positioning reliefs 31*d* are in an intermediate area between the projections and/or seats. Once again at the outer surface of the side 3*a* there may be provided two further parallel longitudinal reliefs, only one of which is visible in FIG. 16, designated by 35*e*, which in the example are configured as parallel longitudinal reliefs, between which the projections 31*a*, the seats 33, and the reliefs 35*d* are located. The reliefs 35*e* project beyond the projections 31*a* and reliefs 31*d* in such a way that between them the corresponding wider lateral parts of the peripheral profile of the substrate 21, i.e., the parts of profile upstream and downstream of the recesses 21*a*, will engage.

In various embodiments, the insert 36' has at least one through opening for a respective blocking element. In the example shown, two through openings or holes are provided, designated by 40', designed to receive each a corresponding angularly rotatable blocking member, in particular a threaded member of the type designated by 41'. Preferably, the arrangement is such that, in the assembled condition, each hole 40' (i.e., each blocking member 41') is in a position corresponding to the back of a respective electrode 22 of the substrate 21.

Once again with reference to the example of FIG. 16, it may be noted how, preferably, the back of the insert 36' presents at least two lateral contrast surfaces 36*d*, preferably but not necessarily defined by a perimetral recess or step of the body of the insert itself. As will be seen, the surfaces 36*d* of the insert 36' are designed to co-operate with the inner surface 35*b'* (FIG. 16) of the rear wall 35*a* of the housing 35', which also in this case preferably has a discontinuity or opening, designated by A only in FIG. 14.

Figure 18:
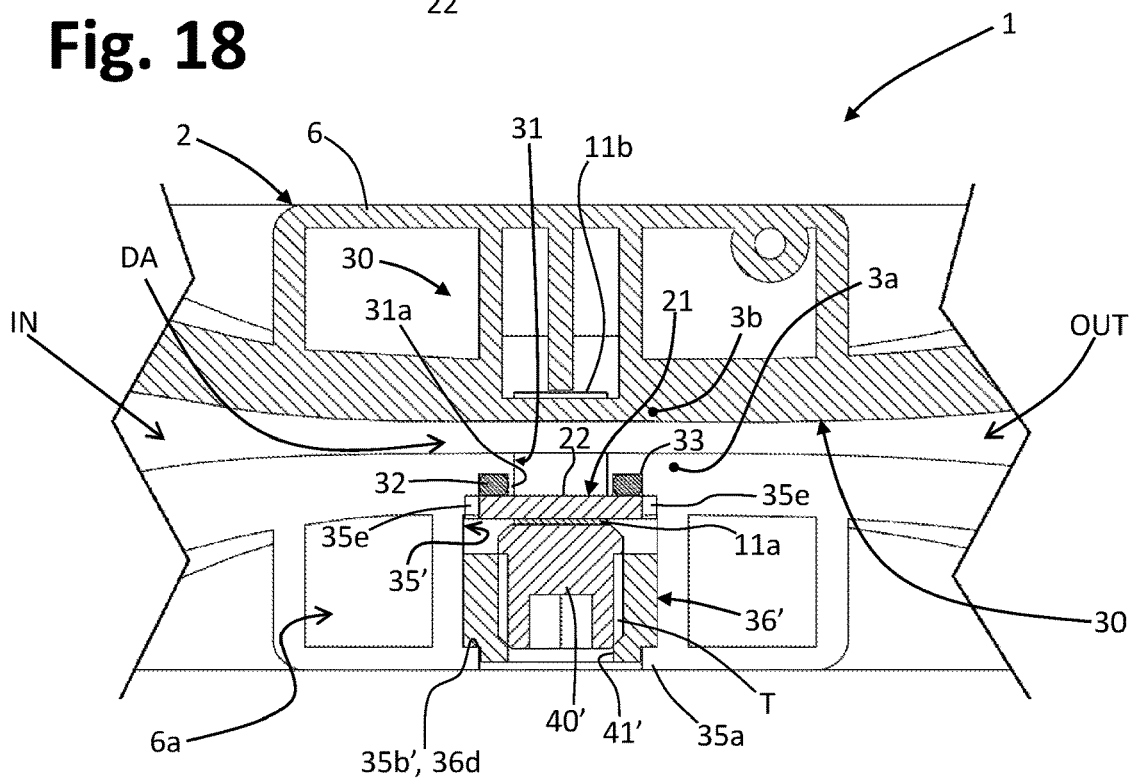
FIGS. 18, 19, and 20 are views similar to those of FIGS. 8, 9, and 10, of a device according to other possible embodiments of the invention.

For the purposes of assembly, after mounting of the gaskets 32 in the corresponding seats 33 and/or around the tubular projections 31*a*, the substrate 21 is arranged within the housing 35' in such a way that the positioning recesses 21*a* will engage between the corresponding reliefs 35*d*, and the wider lateral parts of the peripheral profile of the substrate 21 (upstream and downstream of the recesses 21*a*) will engage between the reliefs 35*e*, as may be noted, for example, from FIG. 18. Next, the electromagnetic arrangement 10 is mounted in such a way that the magnetic pole 11*a* is substantially parallel to and faces the back of the substrate 21, with the other pole 11*b* on the outside of the wall 3*b* of the duct 3 (see also FIGS. 19 and 20).

Next, the insert 36' is inserted into the housing 35' (from above, as viewed in FIGS. 15-16), with its rear recess in the opening A (FIG. 14) of the wall 35*a* of the housing itself: in this way, the contrast surfaces 36*d* of the insert 36' face the corresponding contrast surfaces 35*b'* of the housing. With the insert 36' inserted completely in the housing 35', the front ends of the threaded members 41' engaged in the corresponding holes 40' face the back of the pole 11*a*, preferably in a position substantially corresponding to the electrodes 22 and to the seal rings 32, as may be clearly appreciated, for example, from FIGS. 18 and 19. At this point, as may be seen in FIG. 14, thanks to the presence of the discontinuity A of the outer wall 3*a* of the housing, it is possible to screw the members 41' on the insert 36' (the corresponding coupled threads are designated as a whole by T in FIGS. 18 and 19).

It should, however, be noted that, according to embodiments not shown, at least one blocking member could be provided, for example a screw or similar threaded element, coupled to a respective threaded hole provided in the hydraulic body 2 in a position such that this member can be operated to exert a thrust on at least one from among the insert 36', the magnetic pole 11*a*, and the substrate 21: in such a case, the discontinuity A of FIG. 14 could be omitted and the insert 36' does not necessarily have to envisage holes of the same type as those designated by 40'.

Following upon progressive screwing, the front ends of the members 40' press the pole 11*a*, and hence the substrate 21, towards the outer surface of the side 3*a* of the duct 3, preferably until the front of the substrate itself rests on or pushes against the hydraulic body 2, for example against the cylindrical projections 31*a* when present, in any case causing an axial compression of the gaskets 32 to provide fluid tightness. At the same time, screwing of the members 41' has the effect of pushing the insert 36' backwards, and hence of pushing its rear contrast surfaces 36*d* against the corresponding contrast surfaces 35*b'* defined by the inside of the wall 25*a* of the housing 35', thereby guaranteeing blocking of the insert itself in its working position, as represented in FIGS. 18 and 19.

Figure 19:
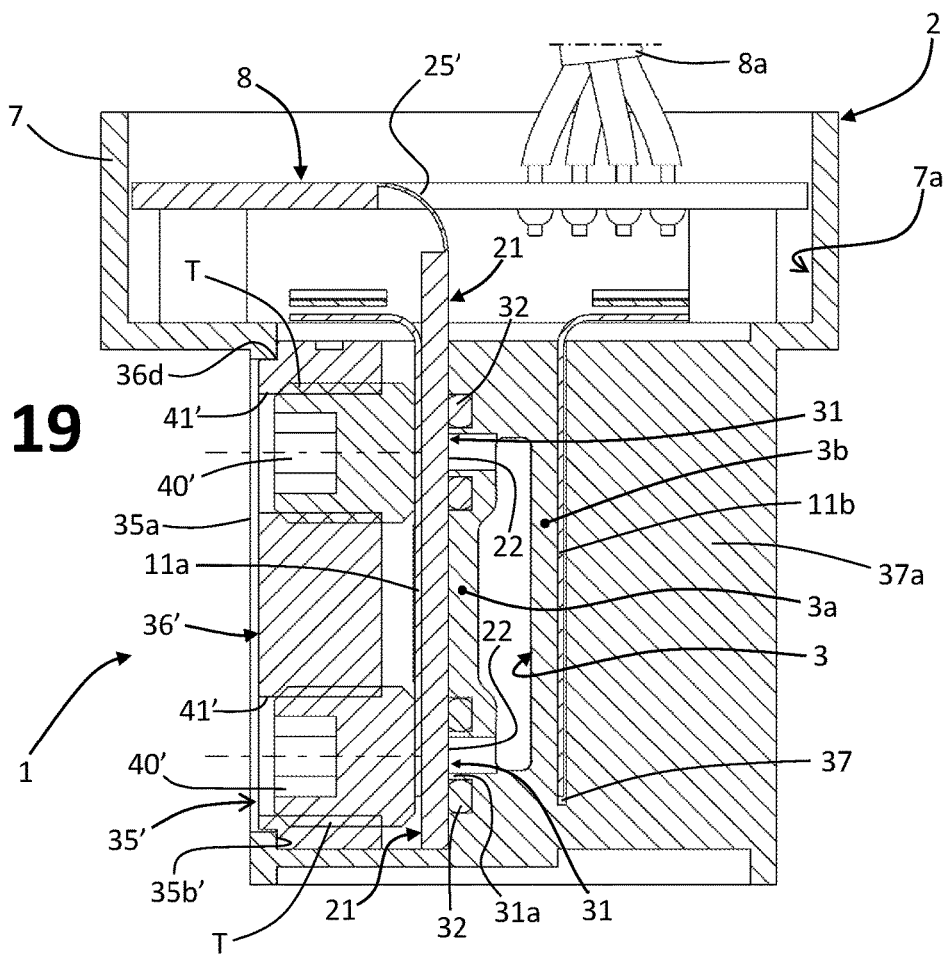
Figure 20:
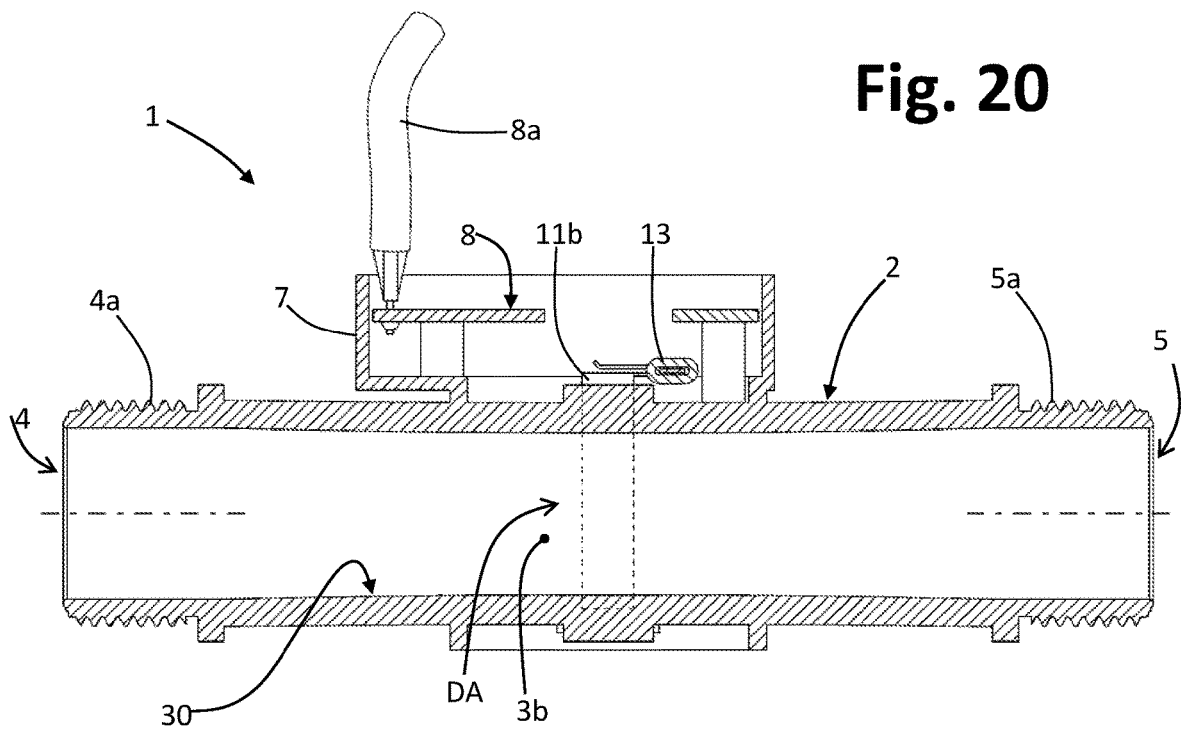

As may be noted from FIG. 19, in the assembled condition of the device 1, the thrust locally applied by the threaded blocking members 41' on the substrate 21 is exerted in areas substantially corresponding to the electrodes 22, and hence to the gaskets 32, thereby guaranteeing good characteristics of fluid tightness.

It should be noted that what has been described in relation to the variants of FIGS. 11 and 12, as regards the presence of three-dimensional electrodes 22' or 22", may also apply to the embodiments described with reference to FIGS. 13-18.

The detection and/or control device according to the invention is more reliable than those provided with an impeller flow sensor, thanks to the elimination of mechanical moving parts, which are subject to wear and sticking. Moreover, the flow sensor of the device according to the invention is able to measure even very small flowrates (of the order millilitres per minute), which cannot be detected via impeller meters.

The particular construction of the flow sensor, with a substrate that supports both of the electrical detection elements and that is arranged on the outside of the duct for the liquid, simplifies production of the device according to the invention also as compared to known devices provided with electromagnetic flow sensors, where it is necessary to mount the electrical detection elements separately. The invention moreover makes it possible to improve the reliability of fluid tightness at the aforesaid electrical elements.

From the foregoing description the characteristics of the present invention are consequently clear, as likewise clear are its advantages The device according to the invention may be devised for just detection of flow or measurement of flowrate, as in the examples of embodiment illustrated, for example for dosed introduction of liquid into a corresponding appliance or system, where dosage is carried out on the basis of a detection of flowrate carried out by the flow sensor. In other embodiments, the device described may comprise further functional elements, such as an electric valve, including an open/close element that can be controlled as a function of detections made by the flow meter in order to open and close the duct internal to the hydraulic body (the hydraulic body 2 of the device 1 may comprise or be associated to at least part of the hydraulic body of an electro-valve). The aforesaid electrical valve may also be located in a remote position with respect to the hydraulic body of the device according to the invention, but in any case controllable as a function of detections made via the flow sensor (for example, a control device, the hydraulic body of which provided with the flow sensor is mounted upstream of a pipe for supply of water to an appliance, downstream of which an electro-valve is instead provided, with the detections made by the flow sensor that are used for controlling the solenoid valve).

The invention described may be implemented also in an anti-flooding safety device, i.e., a device pre-arranged for preventing possible liquid leaking from a supply pipe from spreading into the surrounding environment, thus causing flooding. For example, in such a safety device, a pipe for supply of the liquid extends longitudinally at least in part within an outer pipe, which is also impermeable to the liquid, in such a way that a gap is defined between at least part of the two pipes, which is designed to collect the possible leakage liquid or to convey it to a corresponding leakage sensor, and where an electrical valve upstream or downstream of the inner pipe (for example, integrated in the hydraulic body of the device) can be controlled to interrupt the flow of liquid in the case where leakage of the liquid is detected. Integration of a flow sensor as described previously in such an anti-flooding safety device may be useful for managing operation of the device itself (as has been said, in the case of detection of a leakage) or of the appliance or system served (for example, for calculating the amount of liquid charged into the appliance or system).

It is clear that numerous variants may be made by the person skilled in the branch to the hydraulic control device described by way of example, without thereby departing from the scope of the invention as defined by the ensuing claims.

As has been mentioned, instead of gaskets, the device according to the invention may include sealing means obtained via a deposited material, such as a glue or a sealant. In various embodiments, the substrate 21 could be made of a material that is at least in part elastically yielding, i.e., designed to provide fluid tightness when compressed against the hydraulic body 2, in which case the seats 33 and/or the tubular projections 31*a* could also be omitted. Such a material may be of a polymeric type, such as a PTFE, of a relatively rigid type but at the same time yielding to ensure fluid tightness on a purposely provided edge in relief around the openings 31.

The shape or cross section of the through openings 31 could be different from the ones exemplified, for example polygonal or with a curved or rounded profile (for example, a circular or oval shape), so as to be substantially complementary to corresponding shapes or sections of the electrodes 22, 22', 22". The shape or cross section of the through openings could on the other hand also be different from that of the electrodes.

In various embodiments, in addition to the electrical detection elements, such as the electrodes previously designated by 22, 22', or 22" (and to the possible sensor for measurement of electromagnetic field, such as the coil previously designated by 26), on the substrate 21 there could be provided at least part of the electrical and/or electronic componentry of the device, i.e., at least part of the componentry that in the previous examples of embodiment is implemented in the circuit support designated by 8. In this perspective, for example, the device could comprise a single circuit support or PCB that provides the functions of both of the components previously designated by 8 and 21. It will hence be appreciated that at least one of the detection electrodes, for example provided in the form of electrically conductive pad or track, may be located in the proximity, or on the same support as that, of at least one electronic component used for detecting and/or processing and/or controlling signals obtained via the same electrode (such as a microcontroller, an operational circuit, an amplifier circuit, a memory circuit, etc.) and/or in the proximity, or on the same support as that, of at least one electronic component for control of the energization coil (such as the coil 13) and/or in the proximity of the coil or of the sensor for measuring the magnetic field (such as the coil 26).

In various embodiments, defined on the substrate of the detection arrangement are detection elements or electrically conductive pads having a shape and/or dimensions such as to provide also a uniform resting surface for corresponding sealing means, for example to prevent any unevenness or steps at surfaces where an annular seal element of the type designated previously by 32 is to operate.

FIG. 21 illustrates, for example, the case of a substrate 21, defined on a face of which are electrodes (or tracks or pads) 122, the central front area of which, represented hatched, basically identifies the portion of electrode exposed to the fluid, i.e., electrodes 22 functionally similar to the ones already described previously. The annular or perimetral area of the electrodes (or tracks or pads) 122, designated by 123, i.e., the area of electrode 122 that surrounds the aforesaid central area 22 exposed to the fluid, provides, instead, a resting surface for a sealing element 32. The concept may be particularly appreciated in FIG. 24 and in the corresponding detail of FIG. 25.

FIGS. 21-23 moreover show how, in various embodiments, the electrodes (or tracks or pads) 122 may be located on one first major face of the substrate 21, on the other opposite major face there being instead provided the measurement coil 26 and/or some of the electrically conductive tracks 23 (it being, on the other hand, possible for the coil 26 and/or tracks 23 to be provided on a layer internal to the substrate 21). The conductive parts that are located on opposite faces of the substrate (for example, the pad or electrode 122 further towards the bottom in FIG. 21 and the track 23 further to the left in FIG. 23) may be electrically connected together by means of metallized holes or the like that pass through the body of the substrate between the two faces in question. FIGS. 21 and 23 moreover highlight how to a coil 26 defined by a track 23a on one face of the substrate (FIG. 23) there may be combined a further conductive track 23b, on the opposite face of the substrate 21, for electrical connection with the centre of the coil itself.

FIGS. 26-28 illustrate a similar case, where a track or pad 122 defines an electrode 22 surrounded by an annular portion 123 of track, the electrode and the annular portion being connected together via at least one portion 124 of track. The electrode 22 is hence electrically in contact with the peripheral annular portion 123 (via the portion or portions 124), which is in turn connected to a track 23 or to an electrically conductive through hole of the substrate 21. As for the previous case, the peripheral annular portion 123 provides a uniform resting surface for a respective sealing element 32, as may be clearly seen in FIG. 29 and in the corresponding detail of FIG. 30.

It should be noted, with reference to FIGS. 21-25 and 26-30, that the perimeter of the areas designated by 22 does not necessarily have to correspond with that of the through openings 31, it being possible for these areas 22 to be, for example, wider than the openings 31a.

In various embodiments, the hydraulic detection and/or control device according to the invention may be provided with an autonomous source for electrical supply of its own circuit arrangement, for example via at least one battery, in particular for supplying at least the part of the circuit arrangement corresponding to the flow sensor. In this way, autonomous operation of the device may be possible even in the absence of supply from the electric-power mains or with the liquid-conducting household appliance turned off. The one or more batteries that provide the internal supply source of the device are preferably rechargeable batteries, which can be charged from the electric-power mains directly or via the appliance. Even in the presence of one or more batteries, the circuitry implemented in the device, in particular on its circuit support 8, may be pre-arranged for being supplied also from the power mains, as well as for detecting the possible absence of the mains voltage, and in this case enable supply via the battery or batteries. On the other hand, given that the consumption of electric power determined by the circuit arrangement internal to the device is very low (basically limited to the consumption necessary for generation of the magnetic field via the arrangement 10), this circuit arrangement could be even always supplied by means of an internal supply source of its own.

Individual characteristics described with reference to embodiments described previously may be combined together in other embodiments.

The invention claimed is:

1. A hydraulic detection and/or control device for a liquid-conducting appliance or system, the device comprising:
  a hydraulic body defining a duct for a flow of a liquid, the duct having at least one inlet and one outlet, and being defined at least in part of an electrically insulating material;
  a flow sensor located at least in part on the hydraulic body, which comprises:
  an electromagnetic arrangement, configured for generating an electromagnetic field through the duct in a direction transverse to the flow of the liquid,
  a detection arrangement, which comprises at least two electrical detection elements for detecting a potential difference induced by the flow of the liquid through the electromagnetic field, the at least two electrical detection elements being arranged to be in contact with the liquid,
  wherein each of the at least two electrical detection elements comprises an electrically conductive body having a front surface and a back surface opposite to each other, and a peripheral surface extending between the front surface and a back surface,
  wherein the at least two electrical detection elements are associated, at the back surface of the respective electrically conductive body, to one and the same face of a substrate, the substrate extending substantially on the outside of the duct, in a position corresponding to a first side of the duct defined by the hydraulic body,
  wherein the hydraulic body has at least two through openings at the first side of the duct,
  and wherein each through opening is in a position corresponding to the electrically conductive body of a respective one of the at least two electrical detection elements, the at least two electrical detection elements and the at least two least two through openings being configured in such a way that only the front surface of the electrically conductive body of each electrical detection element faces at least in part the inside of the duct through the corresponding through opening, to be in contact with the liquid.

2. The device according to claim 1, wherein associated to said through openings are sealing means, operatively set between the substrate, or a corresponding electrical detection element, and an outer surface of the first side of the duct.

3. The device according to claim 2, wherein the sealing means comprise at least one annular sealing element associated to one said through opening.

4. The device according to claim 1, further comprising a positioning arrangement configured for urging at least one portion of the substrate towards said first side of the duct, in such a way as to cause an elastic compression of sealing means that are associated to said through openings or operatively set between the substrate, or a corresponding electrical detection element, and an outer surface of the first side of the duct.

5. The device according to claim 1, wherein the hydraulic body defines, at said outer surface of the first side of the duct, at least one of:
  a seat for sealing means associated to one said through opening, and/or
  a tubular projection, which delimits an end portion of one said through opening.

6. The device according to claim 1, wherein the electrical detection elements are planar electrodes deposited on said one and the same face of the substrate.

7. A hydraulic detection and/or control device for a liquid-conducting appliance or system, the device comprising:
- a hydraulic body defining a duct for a flow of a liquid, the duct having at least one inlet and one outlet, and being defined at least in part of an electrically insulating material;
- a flow sensor located at least in part on the hydraulic body, which comprises:
- an electromagnetic arrangement, configured for generating an electromagnetic field through the duct in a direction transverse to the flow of the liquid,
- a detection arrangement, which comprises at least two electrical detection elements for detecting a potential difference induced by the flow of the liquid through the electromagnetic field, the at least two electrical detection elements being arranged to be in contact with the liquid,
- wherein the at least two electrical detection elements are associated to one and the same face of a substrate, the substrate extending substantially on the outside of the duct, in a position corresponding to a first side of the duct defined by the hydraulic body,
- and wherein the hydraulic body has at least two through openings at the first side of the duct, each through opening being in a position corresponding to a respective electrical detection element, in such a way that each electrical detection element faces at least in part the inside of the duct through the corresponding through opening,
- wherein the electromagnetic arrangement has a generally U-shaped configuration, and comprises a first magnetic-pole part and a second magnetic-pole part, connected together by means of a core provided with an electrical coil having corresponding supply conductors, the first magnetic-pole part and the second magnetic-pole part extending generally parallel to one another substantially on the outside of the duct, for generating therebetween the electromagnetic field, the first magnetic-pole part being at the first side of the duct and the second magnetic-pole part being at a second side of the duct that is opposite to the first side.

8. The device according to claim 7, further comprising a measuring arrangement or sensor for measuring the electromagnetic field generated by the electromagnetic arrangement.

9. The device according to claim 7, wherein the duct has a detection region, the flow sensor being installed at the detection region, and wherein the detection region comprises a detection area having a substantially oblong cross section, with said through openings of the hydraulic body at a major side of said cross section.

10. The device according to claim 7, wherein said through openings are defined in a positioning region of the duct which has a substantially oblong cross section, and the substrate is set at said positioning region, substantially parallel to a major dimension of said substantially oblong cross section.

11. A liquid-conducting appliance or system, comprising a hydraulic detection and/or control device according to claim 7.

12. The device according to claim 7, wherein:
- each of the at least two electrical detection elements comprises an electrically conductive body having a front surface and a back surface opposite to each other, and a peripheral surface extending between the front surface and a back surface,
- the back surface of the electrically conductive body of each of the at least two electrical detection elements is associated to said face of the substrate, and
- each through opening is in a position corresponding to the electrically conductive body of a respective one of the eat least two electrical detection elements, in such a way that only the front of the electrically conductive body of each electrical detection element faces at least in part the inside of the duct through the corresponding through opening, to be in contact with the liquid.

13. The device according to claim 7, wherein associated to said through openings are sealing means, operatively set between the substrate, or a corresponding electrical detection element, and an outer surface of the first side of the duct.

14. The device according to claim 7, wherein the hydraulic body defines, at said outer surface of the first side of the duct, at least one of:
- a seat for sealing means associated to one said through opening, or
- a tubular projection, which delimits an end portion of one said through opening.

15. A hydraulic detection and/or control device for a liquid-conducting appliance or system, the device comprising:
- a hydraulic body defining a duct for a flow of a liquid, the duct having at least one inlet and one outlet, and being defined at least in part of an electrically insulating material;
- a flow sensor located at least in part on the hydraulic body, which comprises:
- an electromagnetic arrangement, configured for generating an electromagnetic field through the duct in a direction transverse to the flow of the liquid,
- a detection arrangement, which comprises at least two electrical detection elements for detecting a potential difference induced by the flow of the liquid through the electromagnetic field, the at least two electrical detection elements being arranged to be in contact with the liquid,
- wherein the at least two electrical detection elements are associated to one and the same face of a substrate, the substrate extending substantially on the outside of the duct, in a position corresponding to a first side of the duct defined by the hydraulic body,
- wherein the hydraulic body has at least two through openings at the first side of the duct, each through opening being in a position corresponding to a respective electrical detection element, in such a way that each electrical detection element faces at least in part the inside of the duct through the corresponding through opening,
- wherein the device further comprises a positioning arrangement configured for urging at least one portion of the substrate towards said first side of the duct,
- and wherein:
- the positioning arrangement comprises a positioning insert and a housing, the housing being defined in, or associated to, the hydraulic body and being delimited at least in part by an outer surface of the first side of the duct;
- the housing is configured for receiving at least one corresponding portion of the substrate, associated to which are the at least two electrical detection elements, and at least one corresponding portion of the positioning insert; and
- the positioning insert is configured for being blocked in a working position in the housing, with said corresponding portion of the substrate in an intermediate position between the positioning insert and said outer surface of the first side of the duct, in such a way that said corresponding portion of the substrate is urged towards said outer surface of the first side of the duct.

16. The device according to claim 15, wherein:
the positioning arrangement comprises a positioning insert and a housing, the housing being defined in, or associated to, the hydraulic body and being delimited at least in part by an outer surface of the first side of the duct;
the housing is configured for receiving also at least a corresponding portion of the first magnetic-pole part.

17. The device according to claim 16, wherein the housing is configured for receiving said corresponding portion of the first magnetic-pole part in an intermediate position between the positioning insert and said corresponding portion of the substrate.

18. The device according to claim 15, wherein the positioning insert is insertable in the housing according to an axial direction of the housing, the positioning arrangement moreover including means for fixing the positioning insert in the corresponding working position.

19. The device according to claim 18, wherein the means for fixing the positioning insert in the corresponding working position comprise one of the following:
at least one engagement element associated to, or defined by, the positioning insert, which is engageable in a corresponding engagement seat; or
at least one engagement element of an elastic or snap-in type; or
at least one engagement seat comprising at least one toothed sector; or
at least one rotatable blocking member; or
at least one blocking member, which is engageable in a respective through opening of the positioning insert or of the hydraulic body, in such a way that a front end of the blocking member urges a corresponding portion of the substrate towards said outer surface of the first side of the duct; or
at least one blocking member associated to the positioning insert, wherein a surface of the positioning insert opposite to a front end of the blocking member is urged towards a corresponding contrast surface defined in the housing in a position generally opposite to the first side of the duct; or
at least one blocking member and a corresponding through opening in the positioning insert, which are substantially at a corresponding one said electrical detection element.

20. The device according to claim 15, wherein the housing and the positioning insert define respective inclined planes, configured for co-operating together during insertion of the positioning insert into the housing, in such a way that the positioning insert urges said at least one portion of the substrate towards said outer surface of the first side of the duct.

* * * * *